(12) United States Patent
Takasago et al.

(10) Patent No.: US 11,067,252 B2
(45) Date of Patent: Jul. 20, 2021

(54) VIEWING SYSTEM, DISPLAY DEVICE, STAGE INSTALLATION, AND POLYMERIZABLE LIQUID CRYSTAL COMPOSITION

(71) Applicant: FUJIFILM Corporation, Tokyo (JP)

(72) Inventors: Rie Takasago, Kanagawa (JP); Hiroshi Inada, Kanagawa (JP); Masaru Yoshikawa, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

(21) Appl. No.: 16/371,135

(22) Filed: Apr. 1, 2019

(65) Prior Publication Data
US 2019/0226659 A1    Jul. 25, 2019

Related U.S. Application Data

(63) Continuation of application No. PCT/JP2017/034888, filed on Sep. 27, 2017.

(30) Foreign Application Priority Data

Oct. 25, 2016    (JP) .............................. JP2016-208610

(51) Int. Cl.
*G02F 1/1335*    (2006.01)
*F21V 9/14*    (2006.01)
(Continued)

(52) U.S. Cl.
CPC ................ *F21V 9/14* (2013.01); *A47F 11/06* (2013.01); *A63J 5/02* (2013.01); *G02B 5/30* (2013.01);
(Continued)

(58) Field of Classification Search
CPC ...... G02B 5/3016; G02B 5/30; G02B 27/288; G02B 27/286; G02B 27/28; G02B 26/06;
(Continued)

(56) References Cited

U.S. PATENT DOCUMENTS

2003/0146891 A1* 8/2003 Poliakine .................. G09F 9/35
345/87
2006/0181769 A1* 8/2006 Kumasawa ............ G03B 21/62
359/449

(Continued)

FOREIGN PATENT DOCUMENTS

JP        S55116376        8/1980
JP        2005091785       4/2005
(Continued)

OTHER PUBLICATIONS

"International Search Report (Form PCT/ISA/210) of PCT/JP2017/034888," dated Dec. 19, 2017, with English translation thereof, pp. 1-9.
(Continued)

*Primary Examiner* — Thoi V Duong
(74) *Attorney, Agent, or Firm* — JCIPRNET

(57) ABSTRACT

The present invention provides a viewing system capable of providing varying visual effects with a simpler configuration. In addition, the present invention also provides a display device, a stage installation, and a polymerizable liquid crystal composition. A viewing system according to the present invention is a viewing system for viewing an object to be irradiated including a light source unit, and the object to be irradiated with light emitted from the light source unit, in which the object to be irradiated includes a member, and a first circularly polarized light reflecting layer that is arranged on the member and reflects either right-handed circularly polarized light or left-handed circularly polarized light, the light source unit is capable of emitting
(Continued)

light to be switchable between either right-handed circularly polarized light or left-handed circularly polarized light that is reflected by the first circularly polarized light reflecting layer or natural light, and circularly polarized light having a revolution direction opposite to a revolution direction of the circularly polarized light reflected by the first circularly polarized light reflecting layer, and color of the object to be irradiated is changed by switching light emitted from the light source unit.

10 Claims, 4 Drawing Sheets

(51) Int. Cl.
| | |
|---|---|
| G02B 5/30 | (2006.01) |
| G02B 27/28 | (2006.01) |
| G09F 19/12 | (2006.01) |
| A63J 5/02 | (2006.01) |
| G02B 26/06 | (2006.01) |
| A47F 11/06 | (2006.01) |
| G02F 1/13 | (2006.01) |
| G09F 13/04 | (2006.01) |
| F21W 131/405 | (2006.01) |
| F21W 131/406 | (2006.01) |
| A47F 11/10 | (2006.01) |
| C08F 220/10 | (2006.01) |
| C09K 19/54 | (2006.01) |
| C09K 19/38 | (2006.01) |
| G02F 1/13357 | (2006.01) |

(52) U.S. Cl.
CPC ........... *G02B 5/3016* (2013.01); *G02B 26/06* (2013.01); *G02B 27/28* (2013.01); *G02B 27/286* (2013.01); *G02B 27/288* (2013.01); *G02F 1/13* (2013.01); *G02F 1/133533* (2013.01); *G02F 1/133541* (2021.01); *G09F 13/04* (2013.01); *G09F 19/12* (2013.01); *A47F 11/10* (2013.01); *C08F 220/10* (2013.01); *C09K 19/38* (2013.01); *C09K 19/54* (2013.01); *F21W 2131/405* (2013.01); *F21W 2131/406* (2013.01); *G02F 1/133543* (2021.01); *G02F 1/133621* (2013.01)

(58) Field of Classification Search
CPC ...... G02F 1/13; G02F 1/13362; G02F 1/1335; G02F 1/133553; G02F 1/133602; G02F 1/133603; G02F 1/133604; G02F 1/13718; G02F 2201/343; G02F 2001/133543; G02F 2001/133541; G02F 1/133533; G02F 1/133621; G02F 1/133543; G02F 1/133541; A47F 11/06; A47F 11/10; A63J 5/02; C08F 220/10; C09K 19/38; C09K 19/54; F21V 9/14; F21W 2131/405; F21W 2131/406; G09F 13/04; G09F 19/12
See application file for complete search history.

(56) References Cited

U.S. PATENT DOCUMENTS

| | | |
|---|---|---|
| 2008/0291561 A1 | 11/2008 | Bornhorst |
| 2010/0219251 A1 | 9/2010 | Decoux et al. |

FOREIGN PATENT DOCUMENTS

| | | |
|---|---|---|
| JP | 2009295472 | 12/2009 |
| JP | 2010181828 | 8/2010 |
| JP | 2011501843 | 1/2011 |
| JP | 2011247934 | 12/2011 |

OTHER PUBLICATIONS

"International Preliminary Report on Patentability (Form PCT/IPEA/409) of PCT/JP2017/034888," completed on Aug. 31, 2018, with English translation thereof, pp. 1-19.

* cited by examiner

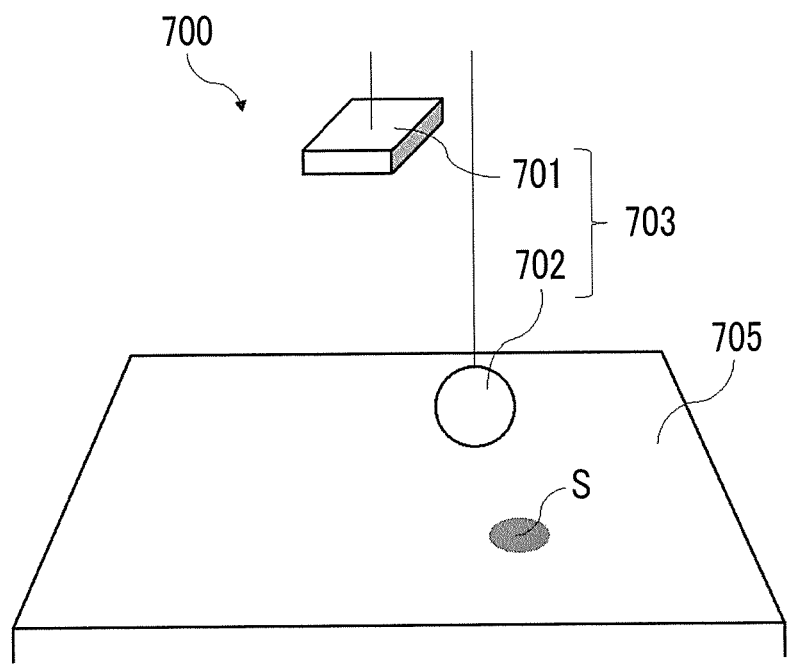

VIEWING SYSTEM, DISPLAY DEVICE, STAGE INSTALLATION, AND POLYMERIZABLE LIQUID CRYSTAL COMPOSITION

CROSS-REFERENCE TO RELATED APPLICATIONS

This application is a Continuation of PCT International Application No. PCT/JP2017/034888 filed on Sep. 27, 2017, which claims priority under 35 U.S.C. § 119(a) to Japanese Patent Application No. 2016-208610 filed on Oct. 25, 2016. The above application is hereby expressly incorporated by reference, in its entirety, into the present application.

BACKGROUND OF THE INVENTION

1. Field of the Invention

The present invention relates a viewing system, a display device, a stage installation, and a polymerizable liquid crystal composition.

2. Description of the Related Art

Viewing systems that provide varying visual effects have been known. Such viewing systems can give a good impression and/or a strong impression to an observer and can be used for display devices such as display shelves of sales goods and show windows, and stage installations used for the circus and the like.

Among these, a viewing system in which the color of a target material irradiated with light (hereinafter, also referred to as "object to be irradiated" in the present specification) changes can be applied to various productions and thus has been actively developed.

As a such a viewing system, for example, JP2009-295472A discloses a production system capable of forming a pattern or the like using a coloring material having a different color appearance change due to illumination and changing a display mode and/or a pattern according to a difference in illumination source.

SUMMARY OF THE INVENTION

The present inventors have conducted an investigation on the production system disclosed in JP2009-295472A and have found that there are problems that a desired visual effect cannot be obtained in some cases due to limitation on a combination of a coloring material and a light source, the wavelength of light to be emitted from a light source has to be changed according to the coloring material, and the selection, preparation, and control of the light source are complicated.

Here, an object of the present invention is to provide a viewing system capable of providing varying visual effects with a simpler configuration.

Another object of the present invention is to provide a display device, a stage installation, and a polymerizable liquid crystal composition.

As a result of intensive investigations to achieve the objects, the present inventors have found that the above objects can be achieved by adopting the following configurations.

[1] A viewing system for viewing an object to be irradiated, the system comprising: a light source unit; and the object to be irradiated with light emitted from the light source unit, in which the object to be irradiated comprises a member, and a first circularly polarized light reflecting layer that is arranged on the member and reflects either right-handed circularly polarized light or left-handed circularly polarized light, the light source unit is capable of emitting light to be switchable between either right-handed circularly polarized light or left-handed circularly polarized light that is reflected by the first circularly polarized light reflecting layer or natural light, and circularly polarized light having a revolution direction opposite to a revolution direction of the circularly polarized light reflected by the first circularly polarized light reflecting layer, and color of the object to be irradiated is changed by switching light emitted from the light source unit.

[2] The viewing system according to [1], in which the object to be irradiated further comprises a second circularly polarized light reflecting layer either on the first circularly polarized light reflecting layer or between the member and the first circularly polarized light reflecting layer, and the second circularly polarized light reflecting layer reflects circularly polarized light having a revolution direction opposite to the revolution direction of the circularly polarized light that is reflected by the first circularly polarized light reflecting layer, and having a selective reflection wavelength different from a selective reflection wavelength of the circularly polarized light that is reflected by the first circularly polarized light reflecting layer.

[3] The viewing system according to [1] or [2], in which the member is transparent in a visible light range.

[4] The viewing system according to any one of [1] to [3], in which the first circularly polarized light reflecting layer contains at least one layer that is formed by fixing a cholesteric liquid crystalline phase.

[5] The viewing system according to any one of [1] to [4], in which the light source unit emits light to be switchable between right-handed circularly polarized light and left-handed circularly polarized light.

[6] The viewing system according to [5], in which the light source unit comprises a light source, and a polarization conversion unit and the polarization conversion unit is capable of transmitting light emitted from the light source and switching a polarization state of the transmitted light between right-handed circularly polarized light and left-handed circularly polarized light.

[7] The viewing system according to [6], in which the polarization conversion unit comprises a linearly polarizing plate and a λ/4 wavelength plate, the linearly polarizing plate and the λ/4 wavelength plate are movable relative to each other to change an angle formed by a transmission axis of the linearly polarizing plate and a slow axis of the λ/4 wavelength plate, and a polarization state of the light transmitted through the polarization conversion unit is switchable between right-handed circularly polarized light and left-handed circularly polarized light by moving the linearly polarizing plate and the λ/4 wavelength plate relative to each other.

[8] A display device comprising: the viewing system according to any one of [1] to [7].

[9] A stage installation comprising: the viewing system according to any one of [1] to [7].

[10] A polymerizable liquid crystal composition comprising: a solvent; a polymerizable liquid crystal compound; a chiral agent; and a polymerization initiator, in which the polymerizable liquid crystal compound contains a liquid crystal compound 1 containing one or more polymerizable groups of at least one kind selected from the group consisting of an acryloyl group and a methacryloyl group in one molecule, and a liquid crystal compound 2 containing two or more polymerizable groups in one molecule, and the solvent has a solubility parameter of 8 to 9 and a boiling point of 55° C. to 150° C. A unit of the solubility parameter is $(cal/cm^3)^{1/2}$.

According to the present invention, it is possible to provide a viewing system capable of providing varying visual effects with a simpler configuration. In addition, it is also possible to provide a display device, a stage installation, and a polymerizable liquid crystal composition.

BRIEF DESCRIPTION OF THE DRAWINGS

FIG. 7 is a schematic view showing a second embodiment of the stage installation according to the present invention.

DESCRIPTION OF THE PREFERRED EMBODIMENTS

Hereinafter, the present invention will be described in detail.

The description of constitutional elements described below is made based on representative embodiments of the present invention, but the present invention is not limited to such embodiments.

In the present specification, a numerical range represented by using "to" indicates a range including the numerical values as the lower limit and the upper limit.

In addition, in the present specification, the term "polymerizable group" refers to a group involved in the polymerization reaction.

It is to be noted that each drawing in the present invention is a schematic view for description, and the shapes, dimensions, mutual positional relationships and the like of the respective members and the like may not match the actual ones.

Further, in the present specification, natural light is intended to mean light in which polarized light having various vibration directions is mixed and exhibits no anisotropy.

First Embodiment of Viewing System

Figure 1:
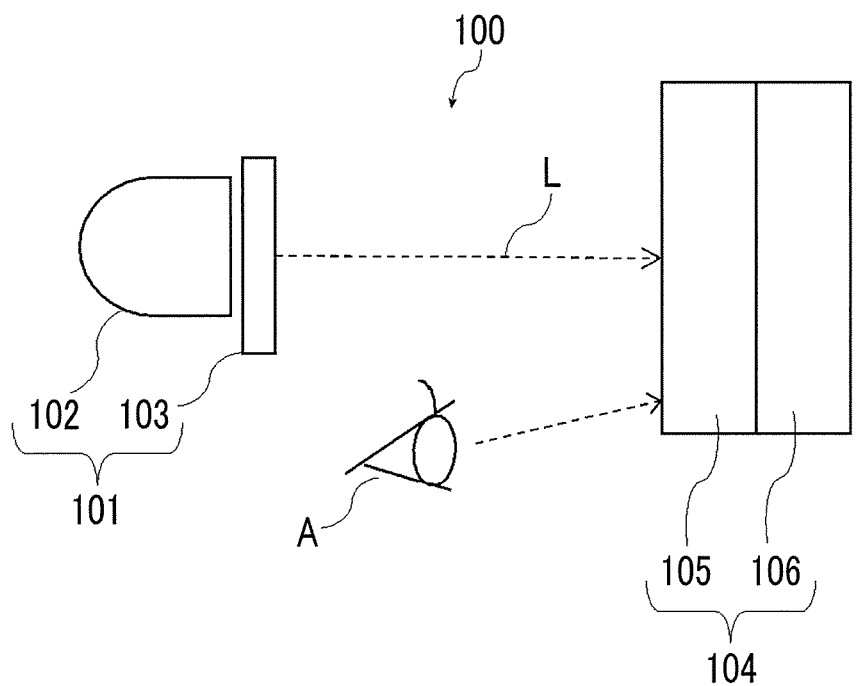
FIG. 1 is a schematic view showing a first embodiment of a viewing system according to the present invention.

FIG. 1 is a schematic view showing a viewing system according to one embodiment of the present invention.

As shown in FIG. 1, a viewing system 100 according to the embodiment comprises a light source unit 101 and an object to be irradiated 104 with light L emitted from the light source unit 101. The light source unit 101 comprises a light source 102 and a polarization conversion unit 103, and the polarization conversion unit 103 is arranged so as to transmit the light emitted from the light source 102.

The light source 102 emits light for irradiating the object to be irradiated 104. The kind of light source 102 is not particularly limited and for example, a light emitting diode (LED); a discharge lamp such as a fluorescent lamp, a xenon lamp, a mercury lamp, a sodium lamp, and a metal halide lamp; a lamp using a filament such as a halogen lamp and an incandescent lamp; an inorganic or organic electro luminescence (EL) lamp; and the like can be used.

In addition, as the light source 102, light having a wavelength obtained by light emission may be used as it is or light converted by a phosphor may be used. The color, brightness, and shape of the light source (the wavelength of emitted light) are selected according to the desired visual effect.

The polarization conversion unit 103 has a function of transmitting the light emitted from the light source 102 and switching the polarization state of the transmitted light. In the present specification, the expression "switching the polarization state" means switching between either right-handed polarized light or left-handed polarized light and circularly polarized light having the revolution direction opposite to the revolution direction of the polarized light or switching between natural light and either or both of right-handed polarized light and left-handed polarized light.

In addition, the term "switching" means changing the polarization state of the transmitted light. There is no particular limitation in the form of the change. For example, in a case of the polarization conversion unit comprising a linearly polarizing plate to be described later and a λ/4 wavelength plate that are movable relative to each other such that an angle formed between a transmission axis of the linearly polarizing plate and a slow axis of the λ/4 wavelength plate is changed, the relative movement of the transmission axis of the linearly polarizing plate and the slow axis of the λ/4 wavelength plate may be continuous or stepwise.

Of these, in a case where the polarization conversion unit 103 is capable of transmitting the light emitted from the light source 102 and switching the polarization state of the transmitted light between right-handed circularly polarized light and left-handed circularly polarized light, an observer easily and clearly perceives a change in the color of the object to be irradiated 104 and thus this case is more preferable.

Figure 2:
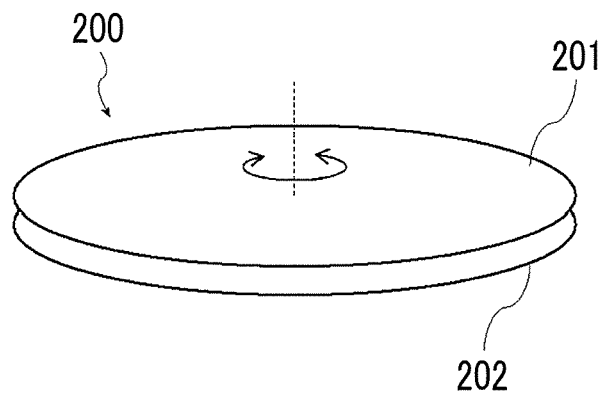
FIG. 2 is a schematic view showing one embodiment of a polarization conversion unit.

FIG. 2 is a schematic view showing one embodiment of a polarization conversion unit. In FIG. 2, a polarization conversion unit 200 comprises a linearly polarizing plate 202 and a λ/4 wavelength plate 201 that is arranged on the linearly polarizing plate 202 to be rotatable. At this time, in a case where the λ/4 wavelength plate 201 is rotated, the angle formed between the transmission axis (not shown) of the linearly polarizing plate 202 and the slow axis (not shown) of the λ/4 wavelength plate 201 is changed and the polarization state of the transmitted light is changed. For example, in a case where natural light is incident from the linearly polarizing plate 202, the angle formed between the transmission axis of the linearly polarizing plate 202 and the slow axis of the λ/4 wavelength plate 201 is set to 45° or the formed angle is set to −45° so that the polarization state of the transmitted light can be switched between right-handed circularly polarized light and left-handed circularly polarized light. In a case where the λ/4 wavelength plate 201 is observed from the plane of the linearly polarizing plate 202, the angle of the transmission axis direction of the linearly polarizing plate 202 is set to 0° and the clockwise direction (right-handed direction) is expressed as a negative angle value.

The polarization conversion unit is not limited to the above embodiment and the linearly polarizing plate and the λ/4 wavelength plate may be relatively movable such that the angle formed between the transmission axis of the linearly polarizing plate and the slow axis of the λ/4 wavelength plate is changed.

As the linearly polarizing plate, any member may be used as long as the member has a function of converting light into a specific linearly polarized light, and an absorption type polarizer can be mainly used. As the absorption type polarizer, an iodine-based polarizer, a dye-based polarizer using a dichroic dye, a polyene-based polarizer, and the like may be used.

The λ/4 wavelength plate is a plate having a function of converting linearly polarized light having a specific wavelength into circularly polarized light (or converting circularly polarized light into linearly polarized light) and refers to an optically anisotropic layer in which an in-plane retardation Re(λ) at a specific wavelength λ nm satisfies Re(λ)= λ/4. This equation may be attained at any wavelength (for example, 550 nm) in the visible light range, but it is preferable that an in-plane retardation Re(550) at a wavelength of 550 nm satisfies the following relationship.

115 nm≤Re(550)≤155 nm

In addition to the above description, for example, the polarization conversion unit 103 may be a right-handed polarizing plate and/or a left-handed polarizing plate that is attachably and detachably arranged. In this case, for example, either the right-handed polarizing plate or the left-handed circularly polarizing plate is arranged, light irradiation from the light source is carried out, the right-handed polarizing plate (or the left-handed circularly polarizing plate) is then removed, and a polarizing plate having an opposite revolution direction (a circularly polarizing plate other than the right-handed polarizing plate and the left-handed circularly polarizing plate) is replaced. Thus, the polarization state of the transmitted light can be changed.

The circularly polarizing plate is not particularly limited and a known circularly polarizing plate can be used. Examples of the known circularly polarizing plate include a circularly polarizing plate using a laminate in which a phase difference plate (for example, a λ/4 wavelength plate) is laminated on a linearly polarizing plate, and a circularly polarizing plate using a cholesteric liquid crystal.

The polarization state of light can be measured using a spectral radiance spectrometer in which a circularly polarizing plate is mounted or a spectrometer. In addition, the polarization state can be measured by attaching a circularly polarizing plate to an illuminance meter or a light spectrometer. The polarization state can be measured such that the amount of right-handed circularly polarized light is measured by attaching a right-handed circularly polarizing plate, and the amount of left-handed circularly polarized light is measured by attaching a left-handed circularly polarizing plate.

The object to be irradiated 104 comprises a member 106 and a first circularly polarized light reflecting layer 105 that is arranged on the member 106, and the first circularly polarized light reflecting layer 105 is directed to the light source unit 101. The side of the object to be irradiated 104 close to the first circularly polarized light reflecting layer 105 is irradiated with the light L emitted from the light source unit 101 and an observer A observes light reflected from the first circularly polarized light reflecting layer 105. Therefore, in a case where the member 106 is colorless and transparent, the observer A mainly perceives the light reflected from the first circularly polarized light reflecting layer 105 as the color of the object to be irradiated 104.

The object to be irradiated 401 is not particularly limited and another layer may be provided between the member 106 and the first circularly polarized light reflecting layer 105. Examples of another layer include an adhesive layer.

The first circularly polarized light reflecting layer 105 reflects either right-handed circularly polarized light or left-handed circularly polarized light. In the viewing system 100 according to the embodiment, the light source unit 101 emits light such that either right-handed circularly polarized light or left-handed circularly polarized light reflected by the first circularly polarized light reflecting layer 105 or natural light, and circularly polarized light having a revolution direction opposite to the revolution direction of the circularly polarized light reflected by the first circularly polarized light reflecting layer 105 can be switched.

Case 1

Accordingly, in a case where circularly polarized light having a revolution direction opposite to revolution direction of the polarized light that is reflected by the first circularly polarized light reflecting layer 105 is emitted from the light source unit 101 (for example, in a case where right-handed circularly polarized light is reflected by the first circularly polarized light reflecting layer 105, left-handed circularly polarized light is emitted from the light source unit 101), the light L emitted from the light source unit 101 is not reflected (transmitted) by the first circularly polarized light reflecting layer 105 and thus the observer A cannot observe the light reflected from the first circularly polarized light reflecting layer 105. In other words, the observer A cannot perceive the color of the first circularly polarized light reflecting layer 105.

Case 2

On the other hand, in a case where either right-handed circularly polarized light or left-handed circularly polarized light reflected by the first circularly polarized light reflecting layer 105 or natural light is emitted from the light source unit 101 (for example, in a case where the first circularly polarized light reflecting layer 105 reflects right-handed circularly polarized light, the right-handed circularly polarized light or natural light is emitted from the light source unit 101), all or part of the light L emitted from the light source unit 101 is reflected by the first circularly polarized light reflecting layer 105 and the observer A can observe the light reflected from the first circularly polarized light reflecting layer 105. In other words, the observer A perceives the color according to the reflected light.

In a case of Case 1, since the observer A does not perceive the color of the first circularly polarized light reflecting layer 105, the color of the object to be irradiated 104 that the observer A perceives is the color corresponding to the color of the member 106. For example, in a case where the member 106 is colorless and transparent, the observer A perceives the object to be irradiated 104 to be colorless and transparent.

In a case of Case 2, since the observer A perceives the color of the first circularly polarized light reflecting layer 105, the color of the object to be irradiated 104 that the observer A perceives is the color corresponding to the color of the light reflected by the first circularly polarized light reflecting layer 105 and the member 106. For example, in a case where the member 106 is colorless and transparent, the observer A perceives the object to be irradiated 104 to have the color of the first circularly polarized light reflecting layer 105.

The viewing system is described as Cases 1 and 2 by switching light emitted from the light source unit and the color of the object to be irradiated can be changed. Even in a case where light emitted from the light source unit is switched to change the color of the object to be irradiated (even in a case where right-handed polarized light, left-handed polarized light, and natural light are switched), the color of objects other than the object to be irradiated (for example, the background such as a wall or a ceiling, a stand to be described in the following example, and the like) is not changed. The point that the color of the object to be irradiated can be changed without changing the color of objects other than the object to be irradiated is one of the features of the viewing system.

The first circularly polarized light reflecting layer 105 may either a right-handed circularly polarized light reflecting layer selectively reflecting right-handed circularly polarized light or a left-handed circularly polarized light reflecting layer selectively reflecting left-handed circularly polarized light. The first circularly polarized light reflecting layer 105 may be constituted of a single layer or may be constituted of a plurality of layers.

It is preferable that the first circularly polarized light reflecting layer 105 contains a layer in which a cholesteric liquid crystalline phase to be described later is fixed. It is known that the cholesteric liquid crystalline phase has circularly polarized light selective reflectivity at which either right-handed circularly polarized light or left-handed circularly polarized light is selectively reflected. The layer in which the cholesteric liquid crystalline phase is fixed can be obtained by curing a layer obtained by a composition containing a polymerizable liquid crystal compound to be described later.

In FIG. 1, although the member 106 is described as a flat plate for easy understanding of the invention, this shape is not particularly limited, and the member may be an article having a three-dimensional shape. That is, the shape, size, and thickness of the member or the like are not particularly limited and can be appropriately selected depending on the desired visual effect.

In addition, the color of the member is not particularly limited and the member may be colorless or may have color. Further, the member may be transparent or opaque.

In a case where the member is colored and opaque, the tint of the object to be irradiated that is observed by the observer can be adjusted according to the color of the member.

For example, for an object to be irradiated comprising an opaque black member, and a right-handed circularly polarized light reflecting layer that is arranged on the member, a case where right-handed circularly polarized light is emitted from a light source unit is assumed.

In this case, the observer perceives the color according to the color at the center wavelength of a wavelength that the right-handed circularly polarized tight reflecting layer selectively reflects as the color of the object to be irradiated. The reason is that since the object to be irradiated comprises the opaque black member, the light not reflected by the right-handed circularly polarized light reflecting layer is absorbed by the member.

On the other hand, for an object to be irradiated comprising an opaque white member, and a right-handed circularly polarized light reflecting layer that is arranged on the member, a case in which right-handed circularly polarized light is emitted from the light source unit is assumed.

In this case, the observer perceives the color corresponding to combined light of the light that is selectively reflected by the right-handed circularly polarized light reflecting layer and the light that is not reflected by the circularly polarized light reflecting layer and is reflected and/or scattered by the member as the color of the object to be irradiated.

As described above, the tint of the object to be irradiated, which is observed by the observer, can be adjusted by the color of the member (the difference in light reflection properties).

Examples of the member include clothes, footwear, tableware, stationery, paper, films, fittings, haberdashery, bedclothes, mats, wallpapers, toys, and sports equipment, and the member is not limited thereto.

The material constituting the member 106 is not particularly limited and any of an inorganic material such as glass and/or metal and an organic material such as plastic may be used. Among these, from the viewpoint of obtaining a more excellent illumination effect, as the material constituting the member 106, glass or plastic is preferable, and of these, glass, acrylic resin, methacrylic resin, epoxy resin, polystyrene resin, polyester resin (for example, polyethylene terephthalate), phenol resin, or vinyl chloride resin is more preferable.

Modification Example of First Embodiment

Figure 3:
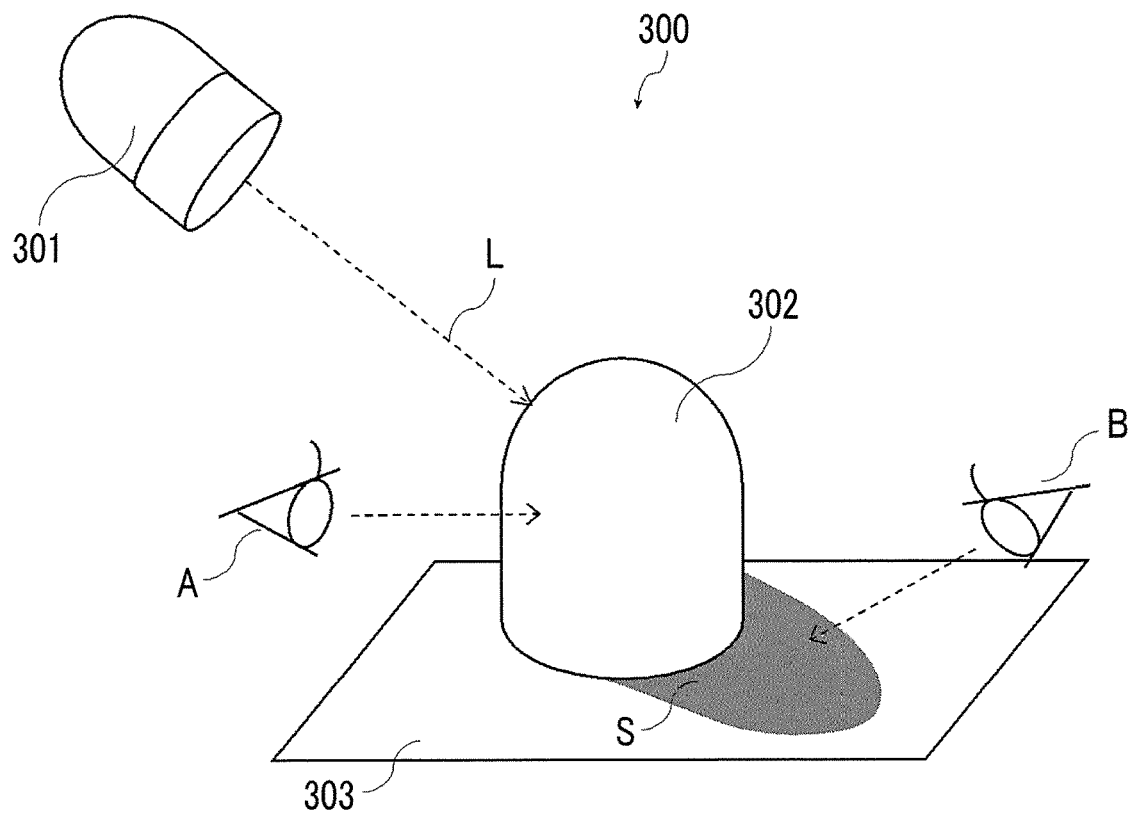
FIG. 3 is a schematic view showing a modification example of the first embodiment of the viewing system according to the present invention.

FIG. 3 is a schematic view showing a modification example of the viewing system according to the embodiment. A viewing system 300 comprises a light source unit 301, and an object to be irradiated 302, and the object to be irradiated 302 is arranged on a stand 303.

The object to be irradiated 302 comprises a first circularly polarized light reflecting layer on a member (not shown), and the member is transparent in the visible light range. In the present specification, the expression "transparent in the visible light range" means including a range in which the average transmittance of light is 50% or more at a visible light wavelength (400 to 800 nm), and it is preferable that the average transmittance of light in the entire visible light range is 50% or more.

As described above, the light source unit 301 can be emitted so as to be switchable between either right-handed circularly polarized light or left-handed circularly polarized light that is reflected by the first circularly polarized light reflecting layer of the object to be irradiated 302 or natural light, and circularly polarized light having a revolution direction opposite to the revolution direction of the circularly polarized light that is reflected by the first circularly polarized light reflecting layer.

Case 1

In a case where circularly polarized light having a revolution direction opposite to the revolution direction of the circularly polarized light that is reflected by the first circularly polarized light reflecting layer is emitted from the light source unit 301 (for example, in a case where the first circularly polarized light reflecting layer reflects right-handed circularly polarized light, left-handed circularly polarized light is emitted from the light source unit 301), light L emitted from the light source unit 301 passes through the first circularly polarized light reflecting layer and the member. Accordingly, the object to be irradiated 302 appears transparent to the observer A. Particularly, in a case where the member of the object to be irradiated 302 is colorless and transparent in the visible light range, the object to be irradiated 302 appears colorless and transparent to the observer A.

In addition, the light emitted from the light source unit 301 passes through the object to be irradiated 302 and is observed as the shadow S as it is by an observer B who observes a shadow S formed by the object to be irradiated 302 on the stand 303. For example, in a case where white light is emitted from the light source unit 301 and the member of the object to be irradiated 302 is colorless and transparent in the visible light range, the observer B perceives a white shadow S.

Case 2

In a case where either right-handed circularly polarized light or left-handed circularly polarized light that is reflected by the first circularly polarized light reflecting layer or natural light is emitted from the light source unit 301 (for example, in a case where the first circularly polarized light reflecting layer reflects right-handed circularly polarized light, right-handed circularly polarized light or natural light is emitted from the light source unit 301), all or part of the light L emitted from the light source unit 101 is reflected by the first circularly polarized light reflecting layer.

At this time, in a case where the member of the object to be irradiated 302 is transparent and colorless in the visible light range, the observer A perceives the light reflected from the first circularly polarized light reflecting layer as the color of the object to be irradiated 302.

On the other hand, the observer B who observes the shadow S observes the shadow S as the complementary color of the color of the object to be irradiated 302 (the color of light in which the light reflected by the first circularly polarized light reflecting layer is eliminated from the irradiation light). It is considered that this is because light having a wavelength other than the wavelength that the first circularly polarized light reflecting layer selectively reflects passes through the object to be irradiated 302 and is reflected by the stand 303 to form the shadow S.

As described above, the viewing system according to the embodiment is capable of providing varying visual effects with a simpler configuration. In addition, in a case where the member is transparent (particularly, colorless and transparent) in the visible light range, the color of the shadow of the object to be irradiated can be changed in addition to the color of the object to be irradiated, and thus a more excellent visual effect can be provided.

Second Embodiment of Viewing System

Figure 4:
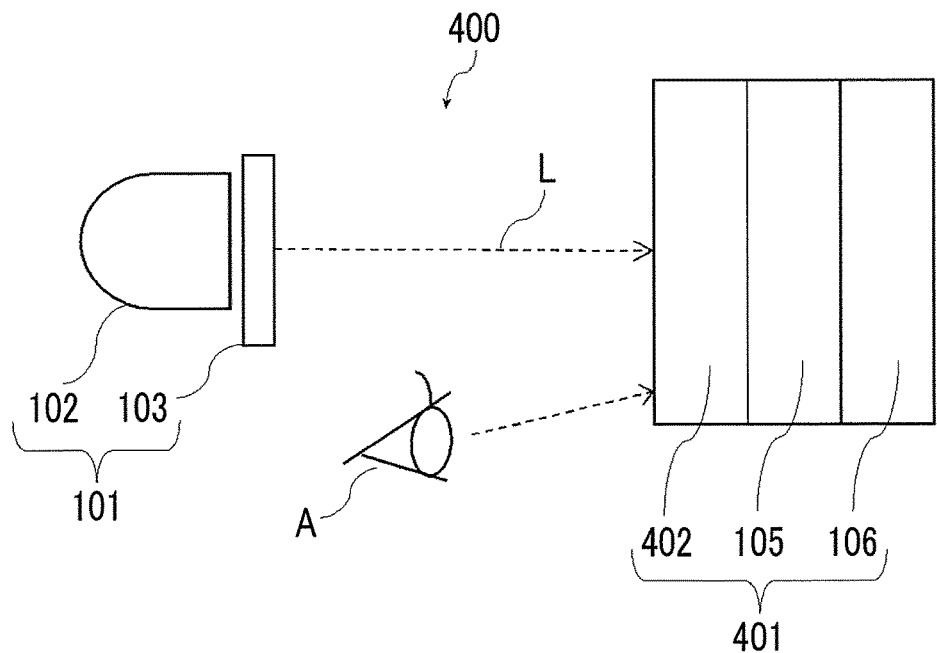
FIG. 4 is a schematic view showing a second embodiment of the viewing system according to the present invention.

FIG. 4 is a schematic view showing a viewing system according to one embodiment of the present invention.

As shown in FIG. 4, a viewing system 400 according to one embodiment comprises a light source unit 101, and an object to be irradiated 401 that is irradiated with light L emitted from the light source unit 101.

The light source unit 101 comprises a light source 102 and a polarization conversion unit 103, and the respective embodiments are as described in the first embodiment of the viewing system.

The object to be irradiated 401 comprises a member 106, and a first circularly polarized light reflecting layer 105 that is arranged on the member 106, and further comprises a second circularly polarized light reflecting layer 402 arranged on the first circularly polarized light reflecting layer 105.

The second circularly polarized light reflecting layer 402 reflects circularly polarized light having a revolution direction opposite to the revolution direction of the circularly polarized light that is reflected by the first circularly polarized light reflecting layer 105 and having a selective reflection wavelength different from the selective reflection wavelength of the circularly polarized light that is reflected by the first circularly polarized light reflecting layer 105.

In the present specification, the expression "a selective reflection wavelength different from the selective reflection wavelength of the circularly polarized light" means that the center wavelength of the wavelength to be selectively reflected (peak wavelength) is different. The center wavelength of the wavelength to be selectively reflected means a center wavelength obtained when measured from a normal direction (helical axis direction) of the circularly polarized light reflecting layer. The method of measuring the center wavelength will be described later in detail.

In FIG. 4, the object to be irradiated 401 adopts an embodiment in which the first circularly polarized light reflecting layer 105 and the second circularly polarized light reflecting layer 402 are provided on the member 106 in this order. However, the object to be irradiated 401 is not particularly limited and an embodiment in which the second circularly polarized light reflecting layer 402 and the first circularly polarized light reflecting layer 105 are provided on the member 106 in this order may be adopted.

In FIG. 2, the member 106, the first circularly polarized light reflecting layer 105, and the second circularly polarized light reflecting layer 402 are in contact with each other. However, the object to be irradiated 401 is not particularly limited and another layer may be provided between each layer (for example, between the member 106 and the first circularly polarized light reflecting layer 105, and between the first circularly polarized light reflecting layer 105 and the second circularly polarized light reflecting layer 402).

As the embodiment of providing another layer between each layer, for example, an embodiment in which a pressure sensitive adhesive layer and/or an adhesive layer (hereinafter, referred to as "pressure sensitive adhesive layer") is provided on the first circularly polarized light reflecting layer 105 and the second circularly polarized light reflecting layer 402 is provided on the pressure sensitive adhesive layer may be adopted.

As described above, the light source unit 101 can emit light so as to be switchable between either right-handed circularly polarized light or left-handed circularly polarized light that is reflected by the first circularly polarized light reflecting layer 105 of the object to be irradiated 401 or natural light, and circularly polarized light having a revolution direction opposite to the revolution direction of the circularly polarized light that is reflected by the first circularly polarized light reflecting layer.

Case 1

In a case where the circularly polarized light having a revolution direction opposite to the revolution direction of the polarized light that is reflected by the first circularly polarized light reflecting layer 105 is emitted from the light source unit 101 (for example, in a case where the first circularly polarized light reflecting layer reflects right-handed circularly polarized light, left-handed circularly polarized light is emitted from the light source unit 101), all or part of the light L emitted from the light source unit 101 is reflected by the second circularly polarized light reflecting layer 402 and the observer A can observe the light reflected from the second circularly polarized light reflecting layer 402. In other words, the color corresponding to the light reflected from the second circularly polarized light reflecting layer 402 is perceived to the observer A.

Case 2

On the other hand, in a case where either right-handed circularly polarized light or left-handed circularly polarized light that is reflected by the first circularly polarized light reflecting layer 105 is emitted from the light source unit 101 (for example, in a case where the first circularly polarized light reflecting layer 105 reflects right-handed circularly polarized light, the right-handed circularly polarized light is emitted from the light source unit 101), the light L emitted from the light source unit 101 passes through the second circularly polarized light reflecting layer 402 and is reflected by the first circularly polarized light reflecting layer 105.

Accordingly, the observer A cannot observe the light reflected from the second circularly polarized light reflecting layer 402 and can observe the light reflected from the first circularly polarized light reflecting layer 105. In other words, the color corresponding to the light reflected from the first circularly polarized light reflecting layer 105 is perceived to the observer A.

Case 3

In addition, in a case where natural light is emitted from the light source unit 101, part of the light L emitted from the light source unit 101 is reflected by both the second circularly polarized light reflecting layer 402 and the first circularly polarized light reflecting layer 105. In this case, the observer A perceives the color corresponding to combined light of the light reflected from the first circularly polarized light reflecting layer 105 and the second circularly polarized light reflecting layer 402.

In the viewing system according to the embodiment, since the selective reflection wavelength of the circularly polarized light reflected by the second circularly polarized light reflecting layer is different from the selective reflection wavelength of the circularly polarized light reflected by the first circularly polarized light reflecting layer, in Cases 1 and 2, the colors of the objects to be irradiated 401 perceived by the respective observers A are different. In addition, similarly, in the case of Case 3, the color different from the colors in Cases 1 and 2 is perceived as the color of the object to be irradiated 401.

As described above, the viewing system according to the embodiment is capable of providing a more excellent visual effect with a simpler configuration by changing the color of the object to be irradiated to various colors.

In a case where the member 106 is transparent (particularly, colorless and transparent) in the visible light range, as in the case described in the modification example of the first embodiment, the color of the object to be irradiated 401 is changed by switching the polarization state of the light emitted from the light source unit 101 so that the color of the shadow of the object to be irradiated 401 can be changed. Thus, a more excellent visual effect can be provided.

Layer Formed by Fixing Cholesteric Liquid Crystalline Phase

The circularly polarized light reflecting layer used in the first embodiment and the second embodiment of the viewing system according to the embodiment of the present invention preferably contains a layer formed by fixing a cholesteric liquid crystalline phase (hereinafter, in the present specification, also referred to as "cholesteric liquid crystal layer"). The circularly polarized light reflecting layer preferably contains one or more cholesteric liquid crystal layers and may contain a plurality of cholesteric liquid crystal layers.

The cholesteric liquid crystal layer is not particularly limited as long as the layer is a layer in which the alignment of the liquid crystal compound having a cholesteric liquid crystalline phase is retained, and a known layer can be used.

As the cholesteric liquid crystal layer, for example, a layer obtained by putting a polymerizing a polymerizable liquid crystal compound described later into an alignment state of a cholesteric liquid crystalline phase and then polymerizing the compound by irradiation with light (for example, ultraviolet rays) or heating may be used.

In the cholesteric liquid crystalline phase, the optical properties of the cholesteric liquid crystalline phase may be retained in the layer, and the liquid crystal compound in the layer no longer exhibits liquid crystallinity. For example, the polymerizable liquid crystal compound may be made to have a high molecular weight resulting from a curing reaction and may lose liquid crystallinity.

The cholesteric liquid crystal layer exhibits circularly polarized light selective reflection derived from the helical structure of the cholesteric liquid crystal. The center wavelength $\lambda$ of the circularly polarized light selective reflection is dependent on a pitch P of the helical structure (=the period of the helix) in the cholesteric liquid crystalline phase and follows a relationship of $\lambda=n\times P$ with the average refractive index n of the cholesteric liquid crystal layer. Therefore, the wavelength exhibiting circularly polarized light selective reflection can be adjusted by adjusting the pitch of the helical structure.

Since the pitch of the cholesteric liquid crystalline phase is dependent on, for example, the kind of a chiral agent in the polymerizable liquid crystal composition to be described later and/or the content thereof, it is possible to obtain a desired pitch by adjusting the kind and the content. The when the circularly polarized light reflecting layer includes two or more cholesteric liquid crystal layers, the center wavelength $\lambda$ of the circularly polarized light selective reflection of the two or more cholesteric liquid crystal layers may be the same or different from each other.

In addition, the sense of the selectively reflected circularly polarized light in the cholesteric liquid crystal layer coincides with the sense of the helix. That is, the cholesteric liquid crystal layer in which the sense of the helix is right-handed selectively reflects right-handed circularly polarized light and the cholesteric liquid crystal layer in which the sense of the helix is left-handed selectively reflects left-handed circularly polarized light.

In the present specification, when the first circularly polarized light reflecting layer includes two or more cholesteric liquid crystal layers, the senses of these cholesteric liquid crystal layers are the same. In addition, when the second circularly polarized light reflecting layer includes two or more cholesteric liquid crystal layers, the senses of these cholesteric liquid crystal layers are the same.

Regarding a method for measuring the sense or pitch of the helix, it is possible to use a method described in p. 46 of "Introduction to Experimental Liquid Crystal Chemistry", by the Japanese Liquid Crystal Society, published by Sigma Publishing Co., Ltd. (2007) and p. 196 of "Liquid Crystal Handbook", by the editorial committee of liquid crystal handbook, published by Maruzen Publishing Co., Ltd.

In addition, a half-width Δλ (nm) of the selective reflection range (circularly polarized light reflecting layer) in a case where circularly polarized light selective reflection is exhibited is dependent on the birefringence Δλ of the liquid crystal compound and the pitch P and follows a relationship of Δλ=Δn×P. Therefore, the width of the selective reflection range can be controlled by adjusting Δn. Δn can be adjusted by adjusting the kind of the polymerizable liquid crystal compound and/or by controlling the temperature during the fixing of alignment.

The center wavelength and the half-width of the selective reflection of the cholesteric liquid crystal layer can be obtained by the following method.

In a case where the transmission spectrum of the cholesteric liquid crystal layer is measured using a spectrophotometer UV 3150 (manufactured by Shimadzu Corporation), a decreasing peak of transmittance in a selective reflection region is observed. Among two wavelengths at which the transmittance becomes a transmittance at a height of ½ of the maximum peak height, when the value of the wavelength on a short wave side is λ1 (nm) and the value of the wavelength on a long wave side is λ2 (nm), the center wavelength of the selective reflection and the half-width can be expressed by the following equations.

Center wavelength=(λ1+λ2)/2

Half-width=(λ2−λ1)

The half-width of the selective reflection range is typically about 50 to 150 nm in one material. In order to widen the selective wavelength range, two or more kinds of cholesteric liquid crystal layers in which the central wavelengths of reflected light with changed periods P are different may be laminated. In addition, in one cholesteric liquid crystal layer, the half-width of the control wavelength range can also be winded by slowly changing the period P in the film thickness direction.

In addition, the circularly polarized light reflecting layer is not particularly limited as long as the circularly polarized light reflecting layer contains at least one cholesteric liquid crystal layer, and another layer may be contained. That is, the circularly polarized light reflecting layer may be a laminate in which a cholesteric liquid crystal layer and another layer are laminated.

The cholesteric liquid crystal layer can be prepared using a liquid crystal composition containing a liquid crystal compound. Among these, from the viewpoint of obtaining a cholesteric liquid crystal layer in a simpler manner, the cholesteric liquid crystal layer is preferably prepared using a polymerizable liquid crystal composition containing a liquid crystal compound containing a polymerizable group (polymerizable liquid crystal compound).

Polymerizable Liquid Crystal Composition

The polymerizable liquid crystal composition is not particularly limited as long as the composition contains a polymerizable liquid crystal compound, and a known polymerizable liquid crystal composition can be used.

The polymerizable liquid crystal composition may contain components other than the polymerizable liquid crystal compound, such as a solvent, a chiral agent, a polymerization initiator, an alignment controlling agent, and a surfactant. Hereinafter, each component contained in the polymerizable liquid crystal composition will be described.

Polymerizable Liquid Crystal Compound

The polymerizable liquid crystal compound is not particularly limited as long as the compound is a liquid crystal compound containing a polymerizable group, and a known polymerizable liquid crystal compound can be used.

The content of the polymerizable liquid crystal compound in the polymerizable liquid crystal composition is not particularly limited, but the content is generally preferably 70% to 95% by mass with respect to the total solid content of the polymerizable liquid crystal composition.

The polymerizable liquid crystal compounds may be used singly or in combination of two or more thereof. In a case where two or more polymerizable liquid crystal compounds are used in combination, it is preferable that the total content is within the above range.

The polymerizable group contained in the polymerizable liquid crystal compound is not particularly limited, and a known polymerizable group can be used.

As the known polymerizable group, for example, polymerizable groups described in paragraphs 0161 to 0171 of JP2002-129162A can be used, and the content thereof is incorporated in the present specification.

The polymerizable group is preferably an ethylenically unsaturated double bond group, and more preferably at least one group selected from the group consisting of an acryloyl group and a methacryloyl group.

Examples of the polymerizable liquid crystal compound include a compound represented by Formula (1) or Formula (3).

Formula (1)

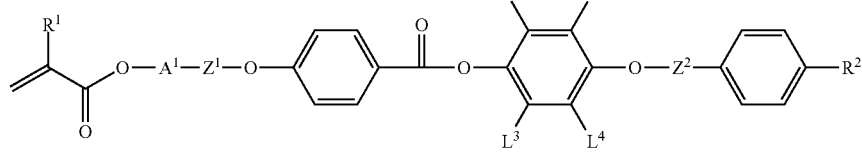

In Formula (1), $A^1$ represents a methylene group having 2 to 18 carbon atoms, where one $CH_2$ or non-adjacent two or more $CH_2$'s in the methylene group may be substituted with —O—;

$Z^1$ represents —CO—, —O—CO—, or a single bond;

$Z^2$ represents —CO— or CO—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group with an alkyl group having 1 to 4 carbon atoms, an N-(2-methacryloyloxyethyl)carbamoyloxy group, an N-(2-acryloyloxy-ethyl)carbamoyloxy group, or a structure represented by Formula (1-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

-$Z^5$-T-Sp-P          Formula (1-2)

In Formula (1-2), P represents an acryl group, a methacryl group, or a hydrogen atom; $Z^5$ represents a single bond, —COO—, —CONR$^1$— (where $R^1$ represents a hydrogen atom or a methyl group), or —COS—; T represents 1,4-phenylene; and Sp represents a divalent aliphatic group having 1 to 12 carbon atoms, which may have a substituent, and one $CH_2$ or two or more non-adjacent $CH_2$'s in the aliphatic group may be substituted with —O—, —S—, —OCO—, —COO—, or —OCOO—.

more polymerizable groups of at least one kind selected from the group consisting of an acryloyl group and a methacryloyl group in one molecule.

In the present specification, the liquid crystal compound 1 and the liquid crystal compound 2 means compounds different from each other.

In a case where the polymerizable liquid crystal composition contains polymerizable liquid crystal compounds different from each other (the liquid crystal compound 1 and the liquid crystal compound 2), the polymerizable liquid crystal compounds are not easily crystallized in the polymerizable liquid crystal composition. The polymerizable liquid crystal composition has more excellent temporal stability. In addition, a polymerizable liquid crystal composition layer formed using the polymerizable liquid crystal composition exhibits more excellent temporal stability during a period before irradiation with ultraviolet rays after the layer formation (for example, after the layer is formed by spraying) and the obtained cholesteric liquid crystal layer has more excellent surface state.

Formula (3)

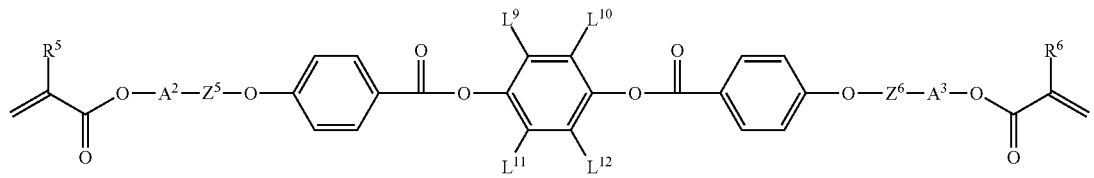

In Formula (3), $A^2$ and $A^3$ each independently represent a methylene group having 2 to 18 carbon atoms, where one $CH_2$ or two or more non-adjacent $CH_2$'s in the methylene group may be substituted with —O—; $Z^5$ represents —CO—, —OCO—, or a single bond; $Z^6$ represents —CO, —COO—, or a single bond; $R^5$ and $R^6$ each independently represent a hydrogen atom or a methyl group; $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

As the polymerizable liquid crystal compound, in addition to the above polymerizable liquid crystal compounds, for example, liquid crystal compounds described in paragraphs 0015 to 0036 of JP2014-198814A can be used, and the content thereof is incorporated in the present specification.

As the polymerizable liquid crystal compound, from the viewpoints of more excellent curability of the polymerizable liquid crystal composition, particularly, curing the polymerizable liquid crystal composition in a shorter period of time (hereinafter, also referred to as "instant curability") and suppressing crystallization of the polymerizable liquid crystal compound, a polymerizable liquid crystal compound containing a liquid crystal compound 1 in which one or more polymerizable groups of at least one kind selected from the group consisting of an acryloyl group and a methacryloyl group are contained in one molecule and a liquid crystal compound 2 in which two or more polymerizable groups are contained in one molecule is preferable.

Among these, from the viewpoint that the obtained cholesteric liquid crystal layer has more excellent curability, more excellent durability, and more excellent strength, it is preferable that the liquid crystal compound 1 contains two or The content of the liquid crystal compound 1 in the polymerizable liquid crystal composition is not particularly limited and generally, the content is preferably 5% to 90% by mass with respect to the total solid content of the polymerizable liquid crystal composition.

The content of the liquid crystal compound 2 in the polymerizable liquid crystal composition is not particularly limited and generally, the content is preferably 5% to 90% by mass with respect to the total solid content of the polymerizable liquid crystal composition.

Solvent

The polymerizable liquid crystal composition preferably contains a solvent.

The solvent is not particularly limited as long as the solvent can dissolve or disperse each component of the polymerizable liquid crystal composition, and a known solvent can be used. Examples of the solvent include water and/or an organic solvent. It is preferable that the polymerizable liquid crystal composition contains an organic solvent.

The content of the solvent in the polymerizable liquid crystal composition is not particularly limited, and the solid content of the polymerizable liquid crystal composition is adjusted to preferably 1% to 50% by mass, and more preferably 1% to 20% by mass. Among these, in a case where the cholesteric liquid crystal layer is formed by spraying the polymerizable liquid crystal composition on the member, the content thereof is preferably adjusted to 1% to 10% by mass.

The solvents may be used singly or in combination of two or more thereof. In a case where two or more solvents are used in combination, the total content is preferably within the above range.

Examples of the organic solvent include butyl ether, dimethoxyethane, diethoxyethane, propylene oxide, 1,4-dioxane, 1,3-dioxolane, 1,3,5-trioxane, teterahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, y-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, and xylene.

The boiling point of the solvent is not particularly limited and in a case where the cholesteric liquid crystal layer is formed by spraying the polymerizable liquid crystal composition on the member, from the viewpoint that a smoother cholesteric liquid crystal layer can be obtained and a sufficient working time can be secured, the boiling point of the solvent is preferably 35° C. to 180° C. and more preferably 55° C. to 150° C.

In a case where two or more solvents are used in combination, the boiling point means the boiling point of a mixture in which the solvents used in combination are mixed. In addition, the boiling point means as a boiling point under 1 atm.

The solubility parameter of the solvent is not particularly limited and from the viewpoint that the polymerizable liquid crystal compound is more easily dissolved and the obtained cholesteric liquid crystal layer is smoother, the solubility parameter is preferably 7.5 to 12 and more preferably 8 to 9. The unit of the solubility parameter is $(cal/cm^3)^{1/2}$.

Preferred Embodiment of Polymerizable Liquid Crystal Composition

In a case where the polymerizable liquid crystal composition contains one or more liquid crystal compound 1 of at least one kind selected from the group consisting of an acryloyl group and a methacryloyl group in one molecule and the liquid crystal compounds 2 containing two or more polymerizable groups in one molecule, and the solvent has a solubility parameter of s 8 to 9 and a boiling point of 55° C. to 150° C., compared to the case where the polymerizable liquid crystal composition is used as a spray ink, a cholesteric liquid crystal layer having a smoother surface and fewer defects can be obtained. The spray ink means a composition used for forming a cholesteric liquid crystal layer on a member by spraying the ink on the member.

Chiral Agent (Optically Active Compound)

The polymerizable liquid crystal composition may contain a chiral agent. The chiral agent induces a helical structure of a cholesteric liquid crystalline phase, and a cholesteric liquid crystalline phase is easily obtained. The chiral agent is not particularly limited, and a known chiral agent can be used.

The content of the chiral agent in the polymerizable liquid crystal composition is not particularly limited and generally, the content is preferably 1% to 15% by mass with respect to the total mass of the polymerizable liquid crystal compound.

The chiral agents may be used singly or in combination of two or more thereof. In a case where two or more chiral agents are used in combination, the total content is preferably within the above range.

Examples of known chiral agents include chiral agents for twisted nematic (TN) and super-twisted nematic (STN) display, compounds described in "Liquid Crystal Device Handbook", Chapter 3, Section 4-3, p. 199, edited by the $142^{nd}$ Committee of the Japan Society for the Promotion of Science, 1989), isosorbide, and isomannide derivatives.

The chiral agent generally contains asymmetric carbon atoms. However, axially asymmetric compounds or planarly asymmetric compounds not containing asymmetric carbon atoms can also be used as the chiral agent. Examples of the axially asymmetric compound or planarly asymmetric compound include binaphthyl, helicene, paracyclophane, and derivatives of these.

The chiral agent may contain a polymerizable group. In a case where the chiral agent has a polymerizable group, by a polymerization reaction of the polymerizable chiral agent and the polymerizable liquid crystal compound, a polymer having a repeating unit induced from the polymerizable liquid crystal compound and a repeating unit induced from the chiral agent can be formed. In this aspect, it is preferable that the polymerizable group of the polymerizable chiral agent is the same group as the polymerizable group of the polymerizable liquid crystal compound. Accordingly, as the polymerizable group of the chiral agent, an ethylenically unsaturated group, an epoxy group, or an aziridinyl group is preferable, and an ethylenically unsaturated group is more preferable. Further, the chiral agent may be a liquid crystal compound.

It is preferable that the chiral agent has a photoisomerizable group since the desired pattern of reflection wavelengths can be formed, responding to the wavelength of light emission, by applying and aligning the polymerizable liquid crystal composition, and then irradiating the coating film with active rays through a photomask. The photoisomerizable group is preferably isomerizable moieties of photochromic compounds, an azo group, an azoxy group or a cinnamoyl group. As specific compounds, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A can be used. In addition, as a commercially available product, PALIOCOLOR LC-756 (manufactured by BASF) or the like can be used.

Polymerization Initiator

The polymerizable liquid crystal composition preferably contains a polymerization initiator.

The content of the polymerization initiator in the polymerizable liquid crystal composition is not particularly limited and from the viewpoint of imparting sufficient curability, the content is preferably 0.5% to 10% by mass and more preferably 1% to 5% by mass with respect to the total solid content of the polymerizable liquid crystal composition.

The polymerization initiators may be used singly or in combination of two or more thereof. In a case where two or more polymerization initiators are used in combination, the total content is preferably within the above range.

The polymerization initiator is not particularly limited and can be appropriately selected from known polymerization initiators. For example, a polymerization initiator having photosensitivity (so-called photo polymerization initiator) is preferable. In addition to the photo polymerization initiator, a thermal polymerization initiator can be used, and these can also be used in combination.

The photo polymerization initiator is not particularly limited as long as the photo polymerization initiator has the ability to initiate polymerization of a polymerizable compound, and a known photo polymerization initiator can be used.

As the photo polymerization initiator, for example, those having photosensitivity to light the visible light range from the ultraviolet range are preferable. In addition, the initiator may be an activator that causes a certain action with a photoexcited sensitizer to produce an active radical or an initiator that initiates cationic polymerization according to the kind of the polymerizable compound.

Examples of the photo polymerization initiator include acetophenones, benzophenones, Michler's benzoyl benzoates, ct-amyloxime esters, phosphine oxides, ketals, anthraquinones, thioxanthones, propiophenones, azo compounds, peroxides, 2,3-dialkyldione compounds, disulfide compounds, fluoroamine compounds, benzyls, benzoins, aromatic diazonium salts, aromatic sulfonium salts, aromatic iodonium salts, metallocene compounds, benzoin sulfonic acid esters, lophine dimers, onium salts, borate salts, active esters, active halogens, an inorganic complex, coumarins, and acylphosphine oxides.

Specific examples of the photo polymerization initiator, and preferable embodiments, and commercially available products are described in paragraphs 0133 to 0151 of JP2009-098658A, and the content thereof is incorporated in the present specification. Examples of commercially available photo polymerization initiators include IRGACURE 819 (bis(2,4,6-trimethylbenzoyl)phenylphosphine oxide, manufactured by BASF), and the like.

Sensitizer

The polymerizable liquid crystal composition preferably contains a sensitizer. The sensitizer is not particularly limited and a known sensitizer can be used.

The content of the sensitizer in the polymerizable liquid crystal composition is not particularly limited and generally, the content is preferably 0.1% to 20% by mass with respect to 100 parts by mass of the polymerization initiator.

The sensitizers may be used singly or in combination of two or more thereof. In a case where two or more sensitizers are used in combination, the total content is preferably within the above range.

Examples of the sensitizer include n-butylamine, triethylamine, tri-n-butylphosphine, and thioxathone. Examples of commercially available sensitizers include "KAYACURE" series manufactured by Nippon Kayaku Co., Ltd.

Alignment Controlling Agent

The polymerizable liquid crystal composition may contain an alignment controlling agent. The alignment controlling agent is not particularly limited, and a known alignment controlling agent can be used.

The content of the alignment controlling agent in the polymerizable liquid crystal composition is not particularly limited and generally, the content is preferably 0.05% to 10% by mass with respect to the total solid content of the polymerizable liquid crystal composition. The alignment controlling agents may be used alone or in combination of two or more thereof. In a case where two or more alignment controlling agents are used in combination, the total content is preferably within the above range.

As the alignment controlling agent, for example, a low molecular weight alignment controlling agent or a high molecular weight alignment controlling agent can be used. As the low molecular weight alignment controlling agent, for example, the description of paragraphs 0009 to 0083 of JP2002-020363A, paragraphs 0111 to 0120 of JP2006-106662A, and paragraphs 0021 to 0029 of JP2012-211306A can be referred to and the content thereof is incorporated in the present specification. In addition, as the high molecular weight alignment controlling agent, for example, the description of paragraphs 0021 to 0057 of JP2004-198511A and paragraphs 0121 to 0167 of JP2006-106662A can be referred to and the content thereof is incorporated in the present specification.

By using the alignment controlling agent, for example, the liquid crystal compound can be brought into a homogeneous alignment state in which the liquid crystal compound is aligned parallel to the surface of the layer.

Surfactant

The polymerizable liquid crystal composition preferably contains a surfactant. The surfactant is not particularly limited, and a known surfactant can be used.

The content of the surfactant in the polymerizable liquid crystal composition is not particularly limited and generally, the content is preferably 0.05% to 10% by mass with respect to the total solid content of the polymerizable liquid crystal composition. Among these, in a case where the cholesteric liquid crystal layer is formed by spraying the polymerizable liquid crystal composition on the member, the content thereof is more preferably 2% to 10% by mass. In a case where the content of the surfactant contained in the polymerizable liquid crystal composition is 2% to 10% by mass, the cholesteric liquid crystal layer formed by spraying the polymerizable liquid crystal composition has a more excellent surface state. In the present specification, the surface state means in-plane uniformity (the cissing of the polymerizable liquid crystal composition does not occur and in-plane color unevenness does not occur).

The surfactants may be used singly or in combination of two or more thereof. In a case where two or more surfactants are used in combination, the total content is preferably within the above range.

Examples of the surfactant include a silicone-based surfactant and a fluorine-based surfactant, and a fluorocarbon-based surfactant is preferable.

Examples of specific surfactants include compounds described in paragraphs 0082 to 0090 of JP2014-119605A, compounds described in paragraphs 0031 to 0034 of JP2012-203237A, compounds described in paragraphs 0092 and 0093 of JP2005-099248A, compounds described in paragraphs 0076 to 0078 and 0082 to 0085 of JP2002-129162A, and compounds described in paragraphs 0018 to 0043 of JP2007-272185A.

Method of Producing Object to Be Irradiated

The method of producing an object to be irradiated used in the viewing system is not particularly limited and preferably includes a step of bringing a member and a polymerizable liquid crystal composition into contact with each other to form a polymerizable liquid crystal composition layer on the member, and a step of irradiating the polymerizable liquid crystal composition layer with light to obtain a cholesteric liquid crystal layer.

The contact method is not particularly limited, and examples thereof include a method of applying the polymerizable liquid crystal composition to the member, a method of immersing the member in the polymerizable liquid crystal composition, and a method of spraying the polymerizable liquid crystal composition on the member. Among these, in a case of spraying, on a member whose relocation is difficult (for example, a large structure or the like), a circularly polarized light reflecting layer can be provided at the location of installation of the member.

In addition to the above methods, as the method of producing an object to be irradiated, a method of forming a cholesteric liquid crystal layer on a temporary support and transferring the resultant cholesteric liquid crystal layer onto a member can also be used.

Display Device

A display device according to an embodiment of the present invention comprises the viewing system. In the following description, the display device will be described.

First Embodiment of Display Device

Figure 5:
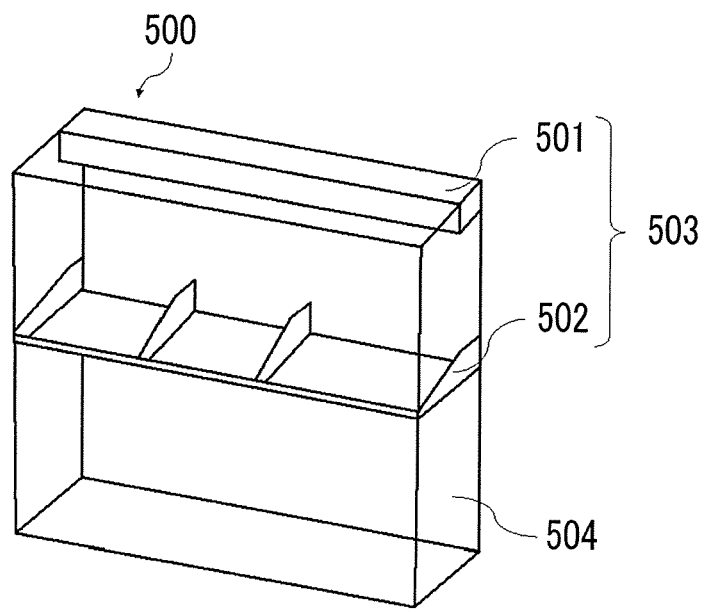
FIG. 5 is a schematic view showing a first embodiment of a display device according to the present invention.

FIG. 5 is a schematic view showing a first embodiment of a display device according to the present invention.

A display device 500 comprises a viewing system 503 comprising a light source unit 501 and an object to be irradiated 502 with light emitted from the light source unit 501, and a cover member 504 that is arranged so as to cover the viewing system 503.

The light source unit 501 comprises a light source (not shown) and a polarization conversion unit, and the embodiment thereof is as already described above.

In FIG. 5, the light source unit 501 is arranged on the object to be irradiated 502. However, the display device according to the embodiment not limited thereto. The light source unit 501 may be arranged on the lower side of the object to be irradiated 502 or may be in contact with the object to be irradiated 502.

The object to be irradiated 502 comprises a white opaque member and a first circularly polarized light reflecting layer that is arranged on the member. The first circularly polarized light reflecting layer is arranged on the side close to the light source unit 501. The embodiment of the first circularly polarized light reflecting layer is as is as already described above.

In FIG. 5, the display device 500 comprises one viewing system 503. However, the display device according to the embodiment is not limited thereto. The display device may comprise a plurality of viewing systems 503.

In FIG. 5, the viewing system 503 comprises one light source unit 501 and one object to be irradiated 502 respectively. However, the viewing system 503 of the display device according to the embodiment is not limited thereto and a plurality of light source units 501 and/or a plurality of objects to be irradiated 502 may be included.

The cover member 504 is arranged so as to cover the viewing system 503.

The material of the cover member 504 is not particularly limited and for example, colorless transparent glass or the like can be used.

In FIG. 5, the display device 500 comprises the cover member 504, but the display device according to the embodiment may not comprise the cover member 504.

In the display device 500, the object to be irradiated 502 has a function as a shelf board for displaying products. In a case where a product to be displayed (not shown) is arranged on the object to be irradiated 502 and light is emitted from the light source unit 501 to be switched between either right-handed circularly polarized light or left-handed circularly polarized light that is reflected by the first circularly polarized light reflecting layer or natural light, and circularly polarized light having a revolution direction opposite to the revolution direction of the circularly polarized light that is reflected by the first circularly polarized light reflecting layer, the color of the object to be irradiated 502 (shelf board) can be changed without changing the color of the product. According to the display device 500, it is possible to emphasize the product (give a strong impression) to the observer.

The object to be irradiated 502 comprises the member and the first circularly polarized light reflecting layer arranged on the member. However, the display device according to the embodiment is not limited thereto. The object to be irradiated 502 may comprise the member, the first circularly polarized light reflecting layer arranged on the member, and a second circularly polarized light reflecting layer arranged on the first circularly polarized light reflecting layer. In this case, the first circularly polarized light reflecting layer and the second circularly polarized light reflecting layer are as already described in the second embodiment of the viewing system.

According to the embodiment, in a case where light is emitted from the light source unit 501 to be switched between right-handed circularly polarized light and left-handed circularly polarized light, the color of the object to be irradiated 502 (shelf board) can be changed without changing the color of the product.

In addition, the object to be irradiated 502 comprises the white opaque member. However, the display device according to the embodiment is not limited thereto. The color of the member can be randomly selected according to the desired visual effect. Among these, in a case where the member is colorless and transparent, even when the light source unit 501 is arranged on the lower side of the object to be irradiated 502, the desired visual effect is easily obtained.

Another Embodiment of Display Device

As the display device according to the embodiment of the present invention, a display device comprising a viewing system including a light source unit and an object to be irradiated (including a transparent or colorless transparent member) that is arranged so as to cover the light source unit may be adopted. The display device has a function as a show window and the object to be irradiated is appreciated with a product to be displayed in the display device.

In the display device, the light source unit has a function as a light source for a show window, and the object to be irradiated has a function as a lampshade of the light source.

In a case where light is emitted from the light source unit to be switched between right-handed circularly polarized light and left-handed circularly polarized light, the color of the object to be irradiated is changed and the color of the shadow of the object to be irradiated is changed. At this time, the color of the product is not changed.

According to the display device, it is possible to emphasize the product (give a strong impression) to the observer.

The embodiments of the light source unit and the object to be irradiated are as already described above.

Stage Installation

A stage installation according to an embodiment of the present invention comprises the viewing system. Hereinafter, the stage installation will be described.

First Embodiment of Stage Installation

Figure 6:
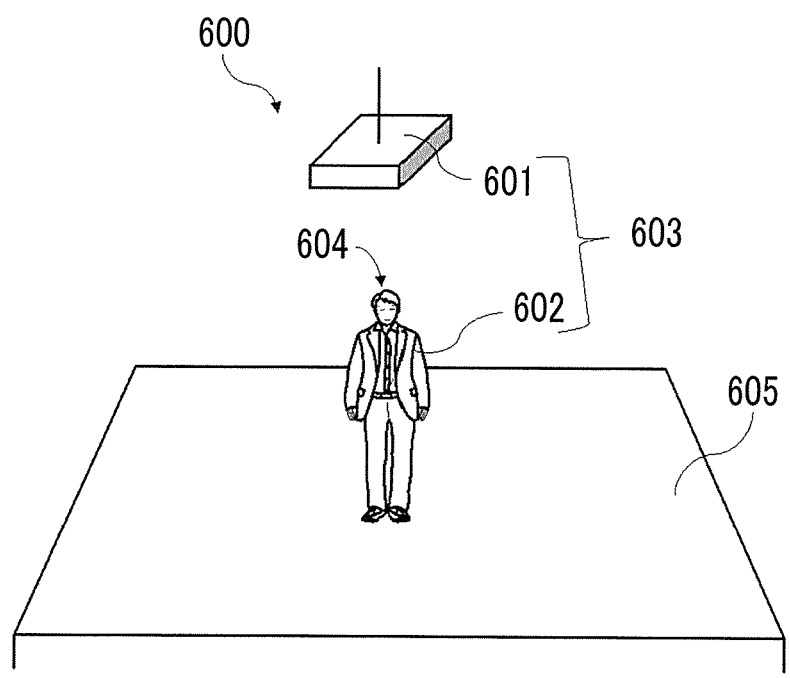
FIG. 6 is a schematic view showing a first embodiment of a stage installation according to the present invention.

FIG. 6 is a schematic view showing a first embodiment of a stage installation according to the present invention.

A stage installation 600 comprises a viewing system 603 including a light source unit 601 which is suspended from a ceiling (not shown) and an object to be irradiated 602 that is irradiated with light emitted from the light source unit 601, and a stage 605 on which the viewing system 603 is arranged. The object to be irradiated 602 is worn by a person 604 on the stage 605.

The light source unit 601 comprises a light source (not shown) and a polarization conversion unit, and the embodiments thereof are as already described above.

In FIG. 6, the light source unit 601 is suspended from the ceiling. However, the stage installation according to the embodiment not limited thereto. The light source unit 601 may be arranged above the stage 605. The light source unit 601 may be arranged at a random position as long as the light source unit emits light on the stage 605.

The object to be irradiated 602 comprises a member which is clothes made of black cloth, a first circularly polarized light reflecting layer that is arranged on the member through a pressure sensitive adhesive layer, and a second circularly polarized light reflecting layer that is arranged on the first circularly polarized light reflecting layer through a pressure sensitive adhesive layer.

The member of the object to be irradiated 602 is clothes made of black cloth, but is not limited thereto. The member may be clothes made of white cloth, clothes made of a transparent (or colorless transparent) film, or the like. According to the material of the member, the tint of the object to be irradiated 602 perceived by the observer can be controlled.

In addition, the object to be irradiated 602 comprises the member, and the first circularly polarized light reflecting layer on the member and the second circularly polarized light reflecting layer. However, the object to be irradiated is not limited thereto. The object to be irradiated 602 may adopt an embodiment including a member and a first circularly polarized light reflecting layer provided on the member.

The object to be irradiated 602 may adopt an embodiment in which a member (for example, clothes made of a colorless transparent film) and a first circularly polarized light reflecting layer arranged on the member.

In FIG. 6, the stage installation 600 comprises one viewing system 603, but the stage installation according to the embodiment is not limited thereto. The stage installation may comprise a plurality of viewing systems 603.

Further, in FIG. 6, the viewing system 603 comprises one light source unit 601 and one object to be irradiated 602 respectively. However, the viewing system 603 of the stage installation according to the embodiment is not limited thereto, and a plurality of light source units 601 and/or a plurality of objects to be irradiated 602 may be included.

In a case where light is emitted from the light source unit 601 to be switched between right-handed circularly polarized light and left-handed circularly polarized light, the color of the object to be irradiated 602 worn by the person 604 can be instantaneously changed without changing the illumination color on the stage 605. According to the stage installation 600, a strong impression can be given to the observer.

As another embodiment, as described above, an embodiment in which the object to be irradiated 602 comprises a colorless transparent member, and a first circularly polarized light reflecting layer that is arranged on the member will be described.

In this case, when light is emitted from the light source unit 601 to be switched between right-handed circularly polarized light and left-handed circularly polarized light, a state in which the person 604 seems as if not wearing clothes can be changed to a state in which the person 604 appears to have worn clothes without changing the illumination color on the stage 605.

Second Embodiment of Stage Installation

FIG. 7 is a schematic view showing a second embodiment of the stage installation according to the present invention.

A stage installation 700 comprises a viewing system 703 including a light source unit 701 which is suspended from a ceiling (not shown) and an object to be irradiated 702 that is irradiated with light emitted from the light source unit 701, and a stage 705 on which the viewing system 703 is arranged. The object to be irradiated 702 is suspended from the ceiling.

The light source unit 701 comprises a light source (not shown) and a polarization conversion unit, and the embodiments thereof are as already described above.

In FIG. 7, the light source unit 701 suspended from the ceiling. However, the stage installation according to the embodiment is not limited thereto. The light source unit 701 may be arranged above the stage 705. The light source unit 701 may be arranged at a random position as long as the light source unit can emit light on the stage 705.

The object to be irradiated 702 comprises a colorless transparent member, a first circularly polarized light reflecting layer arranged on the member, and a second circularly polarized light reflecting layer arranged on the first circularly polarized light reflecting layer.

In FIG. 7, the object to be irradiated 702 has a spherical shape, but the shape of the object to be irradiated 702 is not limited thereto. A shape that can obtain the desired visual effect can be randomly selected.

In FIG. 7, the stage installation 700 comprises one viewing system 703, but the stage installation according to the embodiment is not particularly limited thereto. The stage installation may comprise a plurality of viewing systems 703.

In addition, in FIG. 7, the viewing system 703 comprises one light source unit 701 and one object to be irradiated 702 respectively, but the viewing system 703 of the stage installation according to the embodiment is not limited thereto. A plurality of light source units 701 and/or a plurality of objects to be irradiated 702 may be provided.

In a case where light is emitted from the light source unit 701 to be switched between right-handed circularly polarized light and left-handed circularly polarized light, the color of the object to be irradiated 702 and the color of the shadow S formed by the object to be irradiated 702 on the stage 705 can be instantaneously changed without changing the illumination color on the stage 705. At this time, the color of the object to be irradiated 702 (light reflected from the object to be irradiated) is different from the color of the shadow S (light transmitted from the object to be irradiated). According to the embodiment, a strong impression can be given to the observer of the stage installation 700.

As another embodiment, an embodiment in which the object to be irradiated 702 comprises a colorless transparent member and a first circularly polarized light reflecting layer arranged on the member will be described.

In this case, when light is emitted from the light source unit 701 to be switched between right-handed circularly polarized light and left-handed circularly polarized light, a state in which the object to be irradiated 702 appears colorless and transparent can be changed to a state in which

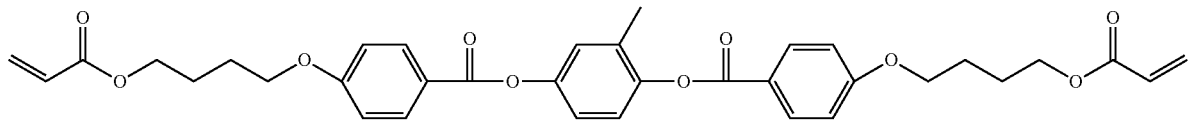

the object to be irradiated 702 appears to have a color without changing the illumination color on the stage 705.

EXAMPLES

Hereinafter, the present invention will be described in more detail based on examples. Materials, used amount, percentage, contents of treatment, treatment procedures, and the like shown in the following examples can be appropriately modified as long as they do not depart from the spirit of the present invention. Therefore, the specific examples as shown below should not be construed to limit the scope of the present invention.

Preparation of Polymerizable Liquid Crystal Composition

The following respective components were mixed at the composition shown in Table 1 to obtain each polymerizable liquid crystal composition. The solid content of each polymerizable liquid crystal composition was adjusted with a solvent (toluene, boiling point: 111° C., solubility parameter: 8.9 $(cal/cm^3)^{1/2}$) such that that content of the polymerizable liquid crystal composition 2 was 5% by mass, the content of the other polymerizable liquid crystal composition was 20% by mass. In addition, each numerical value in Table 1 refers to the content (parts by mass) of each component with respect to the total solid content of the polymerizable liquid crystal composition.

TABLE 1

| | Polymerizable liquid crystal composition (parts by mass) | | | | | |
|---|---|---|---|---|---|---|
| | 1 | 2 | 3 | 4 | 5 | 6 |
| Liquid crystal compound A | 90 | 90 | 90 | 90 | 90 | 90 |
| Liquid crystal compound B | 10 | 10 | 10 | 10 | 10 | 10 |
| Chiral agent a | 6.4 | 5.3 | 4.5 | | | |
| Chiral agent b | | | | 11 | 9.0 | 7.6 |
| Surfactant a | 0.05 | 5 | 0.05 | 0.05 | 0.05 | 0.05 |
| Surfactant b | 0.02 | 2 | 0.02 | 0.02 | 0.02 | 0.02 |
| Polymerization initiator | 3 | 3 | 3 | 3 | 3 | 3 |
| Sensitizer | 1 | 1 | 1 | 1 | 1 | 1 |

TABLE 1-continued

| | Polymerizable liquid crystal composition (parts by mass) | | | | | |
|---|---|---|---|---|---|---|
| | 1 | 2 | 3 | 4 | 5 | 6 |
| Solid content (% by mass) | 20 | 5 | 20 | 20 | 20 | 20 |

Each component in the table is as follows.

Liquid Crystal Compound

Liquid crystal compound A (compound represented by the following formula)

The liquid crystal compound A was synthesized with reference to paragraph 0164 of JP2014-198814A.

Liquid crystal compound B: PALIOCOLOR LC 242 (manufactured by BASF)

Chiral agent a (compound represented by the following formula)

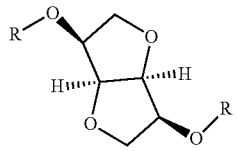

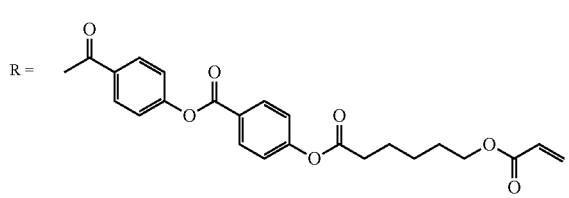

Chiral agent b (compound represented by the following formula)

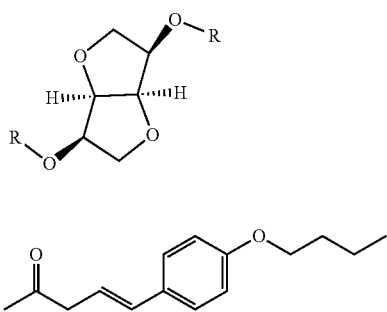

Surfactant a (compound represented by the following formula)

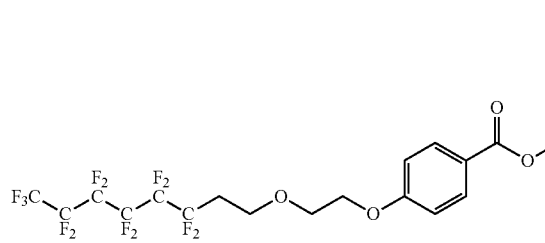

Surfactant b (compound represented by the following formula)

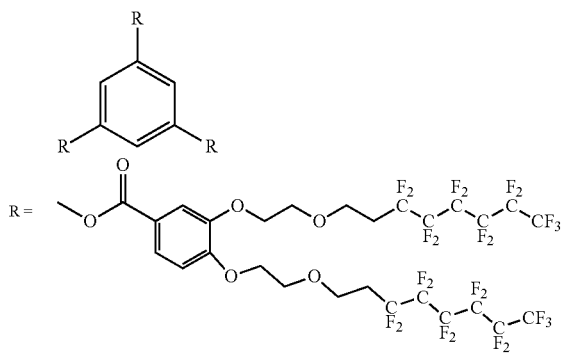

Polymerization initiator (IRGACURE 907)

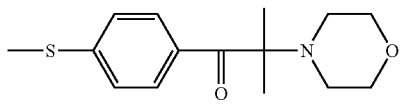

Sensitizer (KAYACURE DETX-S)

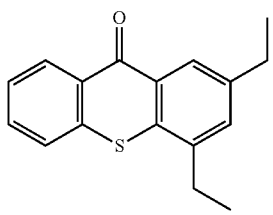 [SMILES: CCc1cc(CC)c2sc3ccccc3c(=O)c2c1]

Preparation of Cholesteric Liquid Crystal Layer

Each of the polymerizable liquid crystal compositions was used to form a polymerizable liquid crystal composition layer on a polyethylene terephthalate (PET) film. Next, the polymerizable liquid crystal composition layer was left to stand at room temperature for 2 minutes. Next, after being left to stand, the PET film was heated in an oven at 90° C. for 2 minutes. Next, the PET film after the heating was taken out from the oven and the PET film after the heating was irradiated with light at a dose of 500 mJ/cm² in the air to cure each polymerizable liquid crystal layer. Thus, each cholesteric liquid crystal layer was obtained.

Regarding the cholesteric liquid crystal layers, the polarization direction of selective reflection and the center wavelength of selective reflection were obtained using a spectrophotometer UV 3150 (manufactured by Shimadzu Corporation). The results are shown in Table 2.

TABLE 2

| | Layer formed by fixing cholesteric liquid crystalline phase | | | | | |
|---|---|---|---|---|---|---|
| | A | B | C | D | E | F |
| Polymerizable liquid crystal composition | 1 | 2 | 3 | 4 | 5 | 6 |
| Polarization direction of selective reflection | Right-handed | Right-handed | Right-handed | Left-handed | Left-handed | Left-handed |
| Center wavelength of selective reflection (nm) | 450 | 550 | 650 | 450 | 550 | 650 |

Example 1

A colorless transparent glass ball (glass spherical body) was prepared as a member. The surface of the glass ball (corresponding to the main surface) was washed with an alkaline detergent and dirt was removed. Next, the glass ball after washing was placed on a net and a polymerizable liquid crystal composition 2 in a spray bottle formed of glass was sprayed to the glass ball. After confirming that the entire surface of the glass ball was wet with the sprayed polymerizable liquid crystal composition 2 (a polymerizable liquid crystal composition layer 2 was formed), the glass ball after spraying was left to stand at room temperature for 2 minutes. When the glass ball after being left to stand was observed under white light, the glass ball was observed in green. Next, the glass ball after being left to stand was heated in an oven at 90° C. for 2 minutes. Next, the glass ball after the heating was taken out from the oven, the glass ball after the heating was irradiated with light at a dose of 500 mJ/cm² in the air to cure the polymerizable liquid crystal composition layer 2, and thus, a circularly polarized light reflecting layer (containing a layer B formed by fixing a cholesteric liquid crystalline phase) was obtained. Therefore, an object to be irradiated 1 exhibiting a bright green structural color under white light compared with the glass ball was obtained.

Next, a glass stand was arranged in a dome-shaped simple studio with a black background and a light source unit was arranged under the stand. The light source unit included a white LED light and a right-handed polarizing plate attachably and detachably arranged on the optical axis.

Next, on the glass stand, the object to be irradiated 1 was arranged. Next, the white LED light was turned on. At this time, the object to be irradiated exhibited a strong green structural color. In addition, at this time, the shadow of the object to be irradiated 1 in the dome part (inner side, ceiling part) of the dome-shaped simple studio exhibited a magenta color. That is, when the shadow of the object to be irradiated 1 was observed, the color of the shadow was magenta.

Next, the right-handed polarizing plate attachably and detachably arranged in the light source unit was removed and instead of the right-handed circularly polarizing plate, a left-handed circularly polarizing plate was arranged.

At this time, the object to be irradiated 1 was colorless. In addition, at this time, the shadow of the object to be irradiated 1 in the dome part (inner side, ceiling part) of the dome-shaped simple studio was white.

Example 2

A colorless transparent PET film was prepared as a member. A polymerizable liquid crystal composition 3 was applied to the PET film using a bar coater to obtain a polymerizable liquid crystal composition layer 3. Next, the PET film after the application was left to stand at room temperature for 2 minutes. When the PET film after being left to stand was observed under white light, the color was red. Next, the PET film after being left to stand was heated in an oven at 90° C. for 2 minutes. Next, the PET film after the heating was taken out from the oven, the PET film after the heating was irradiated with light at a dose of 500 mJ/cm$^2$ in the air to cure the polymerizable liquid crystal composition layer 3, and thus a circularly polarized light reflecting layer 2-1 (containing a layer C formed by fixing a cholesteric liquid crystalline phase) was obtained. Thus, the PET film exhibiting a bright red structural color compared with the PET film after being left to stand was obtained. Next, a polymerizable liquid crystal composition 5 was further applied to the circularly polarized light reflecting layer 2-1 using a bar coater and the polymerizable liquid crystal composition was cured in the same method as the method of curing the polymerizable liquid crystal composition layer 3 already described above to obtain a circularly polarized light reflecting layer 2-2 (containing a layer E formed by fixing a cholesteric liquid crystalline phase). Thus, an object to be irradiated 2 exhibiting a yellow green structural color under white light was obtained. The circularly polarized light reflecting layer surface (the surface provided with the circularly polarized light reflecting layer 2-1 and the circularly polarized light reflecting layer 2-2) of the film of the object to be irradiated 2 was processed into the shape of artificial flowers having multilayered petals.

Next, the artificial flowers were suspended from the dome part (inner side, ceiling part) of a dome-shaped simple studio with white background. At this time, the circularly polarized light reflecting layer was arranged to be directed to the floor (lower side) of the studio. Next, a light source unit was arranged on the floor of the studio. The light source unit included a white LED light and a polarization conversion unit arranged on the optical axis. The polarization conversion unit included a linearly polarizing plate, and a phase difference plate arranged on the linearly polarizing plate to be rotatable and having an in-plane retardation Re(550) of 140 nm at a wavelength of 550 nm.

Next, in a case where the phase difference plate was observed from the linearly polarizing plate surface, adjustment was carried out such that the transmission axis direction of the linearly polarizing plate was set to 0° and the slow axis of the phase difference plate was set to 45°, the white LED light was turned on and the phase difference plate was rotated clockwise. Regarding the angles, in a case where the phase difference plate is observed from the linearly polarizing plate surface, the transmission axis direction of the linearly polarizing plate is set to 0° and the clockwise direction (right-handed direction) is expressed as a negative angle value.

At this time, the color of the object to be irradiated 2 was repeatedly changed to red, yellowish green, green, and yellowish green every time the phase difference plate was rotated by 45°.

In addition, at this time, the shadow of the object to be irradiated in the dome part (inner side, ceiling part) of the dome-shaped simple studio was changed to cyan, blue purple, magenta, and blue purple.

Example 3

A hexahedral body formed of black opaque acrylic resin was prepared as a member. The hexahedral body was dipped (immersed) in the polymerizable liquid crystal composition 3 and then pulled up to form a polymerizable liquid crystal composition layer 3 on the hexahedral body. Next, the hexahedral body after the immersion was left to stand on a net for 2 minutes. When the hexahedral body after the immersion was observed under white light, the color was red. Next, the hexahedral body after the immersion was heated in an oven at 90° C. for 2 minutes. Next, the hexahedral body after the heating was taken out from the oven and the hexahedral body after the heating was irradiated with light at a dose of 500 mJ/cm$^2$ in the air and cured to obtain a circularly polarized light reflecting layer 3-1 (containing a layer C formed by fixing a cholesteric liquid crystalline phase). Thus, a hexahedral body exhibiting a bright red structural color under white light compared with the hexahedral body after being left to stand was obtained. Next, the hexahedral body after the curing was further dipped in a polymerizable liquid crystal composition 4 and then pulled up, the polymerizable liquid crystal composition was cured in the same method as the curing method of the circularly polarized light reflecting layer 3-1 to obtain a circularly polarized light reflecting layer 3-2 (containing a layer D formed by fixing a cholesteric liquid crystalline phase). Thus, an object to be irradiated 3 exhibiting a reddish purple structural color under white light was obtained.

Next, the object to be irradiated 3 was placed on the stand and a light source unit was arranged at the position where this object to be irradiated 3 can be irradiated. The light source unit included a metal halide lamp, and a polarization conversion unit arranged on the optical axis. The polarization conversion unit included a phase difference plate arranged to be rotatable and having an in-plane retardation Re(550) of 125 nm at a wavelength of 550 nm and a linearly polarizing plate.

Next, in a case where the phase difference plate was observed from the linearly polarizing plate surface, adjustment was carried out such that the transmission axis direction of the linearly polarizing plate was set to 0° and the slow axis of the phase difference plate was set to 45°, the metal halide lamp was turned on, and the phase difference plate was rotated clockwise. Then, the color of the object to be irradiated 3 was changed to red, reddish purple, blue, and reddish purple every time the phase difference plate was rotated by 45°.

Example 4

A colorless transparent PET film was prepared as a temporary support. The polymerizable liquid crystal composition 1 was applied to the PET film using a bar coater to obtain a polymerizable liquid crystal composition layer 1. Next, the PET film after the application was left to stand at room temperature for 2 minutes. When the PET film after being left to stand was observed under white light, the color was blue. Next, the PET film after being left to stand was heated in an oven at 90° C. for 2 minutes. Next, the PET film after the heating was taken out from the oven and the PET film after the heating was irradiated with light at a dose of 500 mJ/cm$^2$ in the air to cure the polymerizable liquid crystal composition layer 1. Thus, a circularly polarized light reflecting layer 4-1 (containing a layer A formed by fixing a cholesteric liquid crystalline phase) was obtained. Thus, a PET film (T1) exhibiting a bright blue structural color compared to the PET film after being left to stand was obtained.

Next, a colorless and transparent PET film was newly prepared as a temporary support. A polymerizable liquid crystal composition 6 was applied to the main surface of the PET film using a bar coater to obtain a polymerizable liquid crystal composition layer 6. The polymerizable liquid crystal composition layer was cured in the same method as the curing method of the polymerizable liquid crystal composition 1 already described above to obtain a circularly polarized light reflecting layer 4-2 (containing a layer F formed by fixing a cholesteric liquid crystalline phase). Thus, a PET film (T2) exhibiting a bright red structural color under white light was obtained.

Next, a black shirt was prepared as a member. Next, a transparent pressure sensitive adhesive sheet cut to the shape of a circle was attached to the black shirt.

Next, the PET film (T1) was attached to the black shirt such that the circularly polarized light reflecting layer 4-1 was directed to the transparent pressure sensitive adhesive sheet, the circularly polarized light reflecting layer 4-1 was attached to the black shirt, and then the temporary support was removed. Next, a transparent pressure sensitive adhesive sheet cut to the same shape described above was attached to the circularly polarized light reflecting layer 4-1. Then, in the same manner, the circularly polarized light reflecting layer 4-2 was transferred from the PET film (T2) onto the circularly polarized light reflecting layer 4-1 and thus an object to be irradiated 4 in which the circularly polarized light reflecting layer 4-1, the pressure sensitive adhesive layer, and the circularly polarized light reflecting layer 4-2 were provided on the member in this order was obtained.

Next, the object to be irradiated 4 was irradiated with light from the light source described in Example 3. The color of the object to be irradiated 4 was changed to blue, blue purple, red, and blue purple every time the phase difference plate was rotated by 45°.

Example 5

An object to be irradiated 5 comprising a circularly polarized light reflecting layer 5-1 (containing a layer A formed by fixing a cholesteric liquid crystalline phase), and a circularly polarized light reflecting layer 5-2 (containing a layer F formed by fixing a cholesteric liquid crystalline phase) on a member was obtained in the same manner as in Example 4 except that in the preparation of the object to be irradiated 4, instead of the black shirt used as the member, a white shirt was used.

Next, the object to be irradiated 5 was irradiated with light from the light source described in Example 3. The color of the object to be irradiated 5 was changed to yellow, blue green, cyan and blue green every time the phase difference plate was rotated by 45°.

Regarding Examples 1 to 5, the results are collectively shown in Table 3.

TABLE 3

|  |  | Example | | | | |
| --- | --- | --- | --- | --- | --- | --- |
|  |  | 1 | 2 | 3 | 4 | 5 |
| Member | Material | Glass | PET | Acrylic resin | Cloth | Cloth |
|  | Transparent/opaque | Transparent (colorless and transparent) | Transparent (colorless and transparent) | Opaque (black) | Opaque (black) | Opaque (white) |
| First circularly polarized light reflecting layer | Layer formed by fixing cholesteric liquid crystalline phase | B | C | C | A | A |
| Second circularly polarized light reflecting layer | Layer formed by fixing cholesteric liquid crystalline phase | None | E | D | F | F |
| Light source unit | Light source | White LED | White LED | Metal halide lamp | Metal halide lamp | Metal halide lamp |
|  | Light conversion unit | Circularly polarizing plate | Linearly polarizing plate and rotatable phase difference plate (Re = 140 nm) | Linearly polarizing plate and rotatable phase difference plate (Re =124 nm) | Linearly polarizing plate and rotatable phase difference plate (Re =124 nm) | Linearly polarizing plate and rotatable phase difference plate (Re =124 nm) |
| Change in color | Reflected light | Green to colorless | Red, yellowish green, green, and yellowish green | Red, reddish purple, blue, and reddish purple | Blue, blue purple, red, and blue purple | Yellow, blue green, cyan, and blue green |
|  | Shadow (transmitted light) | Magenta to transmitted light (white) | Cyan, blue purple, magenta, and blue purple | None | None | None |

From the results shown in Table 3, the viewing systems of Examples 1 to 5 had the effect of the present invention.

In the viewing system of Example 1 comprising the object to be irradiated including the first circularly polarized light reflecting layer on the colorless transparent member and the viewing system of Example 2 comprising the first circularly polarized light reflecting layer and the second circularly polarized light reflecting layer on the colorless transparent member, the color (reflected light) of the object to be irradiated and the color of the shadow were changed by switching the light emitted from the light source unit.

In addition, in the viewing system of Example 4 including the object to be irradiated comprising the black opaque member and the viewing system of Example 5 including the object to be irradiated comprising the white opaque member, it was found that the tint of the reflected light (the tint of the object to be irradiated) was different.

Example C

A polymerizable liquid crystal composition c was prepared in the same manner as in Example 1 except that in the preparation of the polymerizable liquid crystal composition 2, instead of the liquid crystal compound B, a liquid crystal compound C represented by the following formula was used.

Then, a viewing system was prepared in the same manner as in Example 1 except that instead of the polymerizable liquid crystal composition 2, the polymerizable liquid crystal composition c was used and the same results as the results of Example 1 were obtained.

Liquid crystal compound C (compound represented by the following formula)

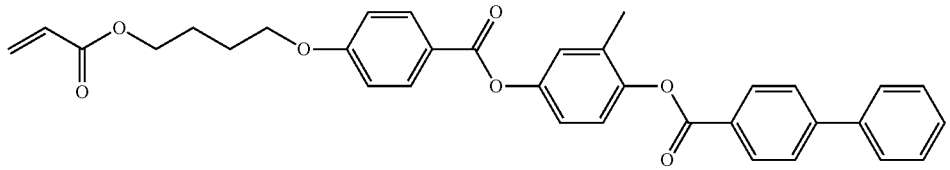 [SMILES: C=CC(=O)OCCCCOc1ccc(C(=O)Oc2ccc(OC(=O)c3ccc(-c4ccccc4)cc3)c(C)c2)cc1]

The liquid crystal compound C was synthesized with reference to paragraph 0133 of JP2014-198814A.

EXPLANATION OF REFERENCES

100, 300, 400, 503, 603, 703: viewing system
101, 301, 501, 601, 701: light source unit
102: light source
103: polarization conversion unit
104, 302, 401, 502, 602, 702: object to be irradiated
105: first circularly polarized light reflecting layer
106: member
200: polarization conversion unit
201: λ/4 wavelength plate
202: linearly polarizing plate
303: stand
402: second circularly polarized light reflecting layer
504: cover member
604: person
605, 705: stage
A: observer
B: observer
L: light
S: shadow

What is claimed is:

1. A display device comprising a viewing system for viewing an object to be irradiated, the system comprising:
a light source unit; and
the object to be irradiated with light emitted from the light source unit,
wherein the object to be irradiated comprises a member, and a first circularly polarized light reflecting layer that is arranged on the member and reflects either right-handed circularly polarized light or left-handed circularly polarized light,
the light source unit is capable of emitting light to be switchable between either right-handed circularly polarized light or left-handed circularly polarized light that is reflected by the first circularly polarized light reflecting layer or natural light, and circularly polarized light having a revolution direction opposite to a revolution direction of the circularly polarized light reflected by the first circularly polarized light reflecting layer, and
color of the object to be irradiated is changed by switching light emitted from the light source unit
wherein the object to be irradiated further comprises a second circularly polarized light reflecting layer either on the first circularly polarized light reflecting layer or between the member and the first circularly polarized light reflecting layer, and the second circularly polarized light reflecting layer reflects circularly polarized light having a revolution direction opposite to the revolution direction of the circularly polarized light that is reflected by the first circularly polarized light reflecting layer, and having a selective reflection wavelength different from a selective reflection wavelength of the circularly polarized light that is reflected by the first circularly polarized light reflecting layer.

2. A stage installation comprising a viewing system for viewing an object to be irradiated, the system comprising:
a light source unit; and
the object to be irradiated with light emitted from the light source unit,
wherein the object to be irradiated comprises a member, and a first circularly polarized light reflecting layer that is arranged on the member and reflects either right-handed circularly polarized light or left-handed circularly polarized light,
the light source unit is capable of emitting light to be switchable between either right-handed circularly polarized light or left-handed circularly polarized light that is reflected by the first circularly polarized light reflecting layer or natural light, and circularly polarized light having a revolution direction opposite to a revolution direction of the circularly polarized light reflected by the first circularly polarized light reflecting layer, and
color of the object to be irradiated is changed by switching light emitted from the light source unit
wherein the object to be irradiated further comprises a second circularly polarized light reflecting layer either on the first circularly polarized light reflecting layer or between the member and the first circularly polarized light reflecting layer, and
the second circularly polarized light reflecting layer reflects circularly polarized light having a revolution direction opposite to the revolution direction of the circularly polarized light that is reflected by the first circularly polarized light reflecting layer, and having a selective reflection wavelength different from a selective reflection wavelength of the circularly polarized light that is reflected by the first circularly polarized light reflecting layer.

3. A viewing system for viewing an object to be irradiated, the system comprising:
a light source unit; and
the object to be irradiated with light emitted from the light source unit,
wherein the object to be irradiated comprises a member, and a first circularly polarized light reflecting layer that is arranged on the member and reflects either right-handed circularly polarized light or left-handed circularly polarized light,
the light source unit is capable of emitting light to be switchable between either right-handed circularly polarized light or left-handed circularly polarized light that is reflected by the first circularly polarized light reflecting layer or natural light, and circularly polarized light having a revolution direction opposite to a revolution direction of the circularly polarized light reflected by the first circularly polarized light reflecting layer, and
color of the object to be irradiated is changed by switching light emitted from the light source unit
wherein the object to be irradiated further comprises a second circularly polarized light reflecting layer either on the first circularly polarized light reflecting layer or between the member and the first circularly polarized light reflecting layer, and
the second circularly polarized light reflecting layer reflects circularly polarized light having a revolution direction opposite to the revolution direction of the circularly polarized light that is reflected by the first circularly polarized light reflecting layer, and having a selective reflection wavelength different from a selective reflection wavelength of the circularly polarized light that is reflected by the first circularly polarized light reflecting layer.

4. The viewing system according to claim 3,
wherein the first circularly polarized light reflecting layer contains at least one layer that is formed by fixing a cholesteric liquid crystalline phase.

5. The viewing system according to claim 4,
wherein the light source unit emits light to be switchable between right-handed circularly polarized light and left-handed circularly polarized light.

6. The viewing system according to claim 3,
wherein the light source unit emits light to be switchable between right-handed circularly polarized light and left-handed circularly polarized light.

7. The viewing system according to claim 6,
wherein the light source unit comprises a light source and a polarization conversion unit, and
the polarization conversion unit is capable of transmitting light emitted from the light source and switching a polarization state of the transmitted light between right-handed circularly polarized light and left-handed circularly polarized light.

8. The viewing system according to claim 7,
wherein the polarization conversion unit comprises a linearly polarizing plate and a $\lambda/4$ wavelength plate,
the linearly polarizing plate and the $\lambda/4$ wavelength plate are movable relative to each other to change an angle formed by a transmission axis of the linearly polarizing plate and a slow axis of the $\lambda/4$ wavelength plate, and
a polarization state of the light transmitted through the polarization conversion unit is switchable between right-handed circularly polarized light and left-handed circularly polarized light by moving the linearly polarizing plate and the $\lambda/4$ wavelength plate relative to each other.

9. The viewing system according to claim 3,
wherein the first circularly polarized light reflecting layer contains at least one layer that is formed by fixing a cholesteric liquid crystalline phase.

10. The viewing system according to claim 3,
wherein the light source unit emits light to be switchable between right-handed circularly polarized light and left-handed circularly polarized light.

* * * * *